United States Patent [19]

Hoshino et al.

[11] Patent Number: 5,615,200
[45] Date of Patent: Mar. 25, 1997

[54] LIGHT BEAM SHAPING DEVICE TO CHANGE AN ANISOTROPIC BEAM TO AN ISOTROPIC BEAM FOR REDUCING THE SIZE OF AN OPTICAL HEAD

[75] Inventors: Isao Hoshino, Yokohama; Shoko Wachi, Tokyo; Yoshinori Honguh; Masahiko Tanaka, both of Yokohama, all of Japan

[73] Assignee: Kabushiki Kaisha Toshiba, Kawasaki, Japan

[21] Appl. No.: 421,965

[22] Filed: Apr. 14, 1995

Related U.S. Application Data

[63] Continuation-in-part of Ser. No. 118,743, Sep. 10, 1993, abandoned.

[30] Foreign Application Priority Data

Sep. 10, 1992 [JP] Japan ................................. 4-241891
Sep. 7, 1994 [JP] Japan ................................. 6-213327

[51] Int. Cl.[6] .................................................. G11B 7/00
[52] U.S. Cl. ..................... 369/112; 369/44.37; 369/103; 369/116; 369/121
[58] Field of Search .................................... 369/112, 103, 369/109, 116, 110, 44.37, 121

[56] References Cited

U.S. PATENT DOCUMENTS

| | | | |
|---|---|---|---|
| 4,823,334 | 4/1989 | Tanaka et al. ................... | 369/112 |
| 4,885,734 | 12/1989 | Yuzo .................................... | 369/109 |
| 5,293,372 | 3/1994 | Hoshino et al. ....................... | 369/116 |
| 5,408,450 | 4/1995 | Nagahama et al. ................. | 369/103 |
| 5,442,616 | 8/1995 | Ogata et al. ......................... | 369/112 |
| 5,493,552 | 2/1996 | Kobori ................................. | 369/109 |
| 5,517,479 | 5/1996 | Nakanishi et al. .................. | 369/109 |

Primary Examiner—Georgia Y. Epps
Assistant Examiner—Kim-Kwok Chu
Attorney, Agent, or Firm—Oblon, Spivak, McClelland, Maier & Neustadt, P.C.

[57] ABSTRACT

An optical head device adapted to be optically coupled to an optical disk includes a light-source laser and an objective lens optically coupled thereto. This lens receives an output light of the light source, and causes it to be projected onto the optical disk to form a focused spot thereon. Photodetectors which are arranged near the light-source laser are optically coupled to the lens in one optical path so that they are responsive to a light component which is reflected from the optical disk toward the photodetectors by way of the objective lens. A beam-shaping prism is located between the lens and a group of the light source and the photodetectors in the optical path. When the laser output light travels toward the lens, the prism reshapes the light into a predetermined isotropic beam profile. When the reflected light from the optical disk propagates reversely along the same optical path to enter the beam-shaping prism, this prism permits such an incident light to pass through itself toward the photodetectors.

27 Claims, 25 Drawing Sheets

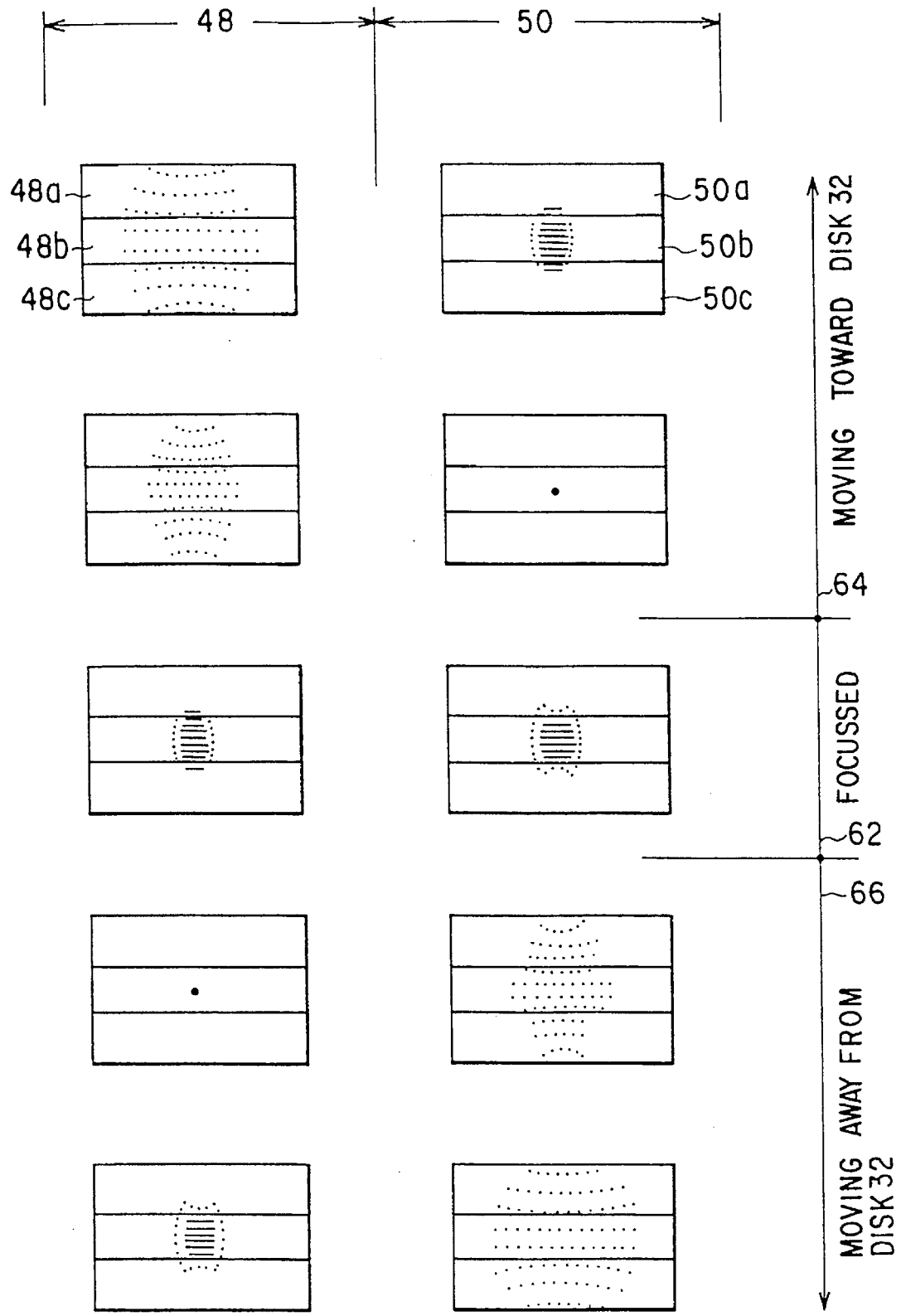
F I G. 5

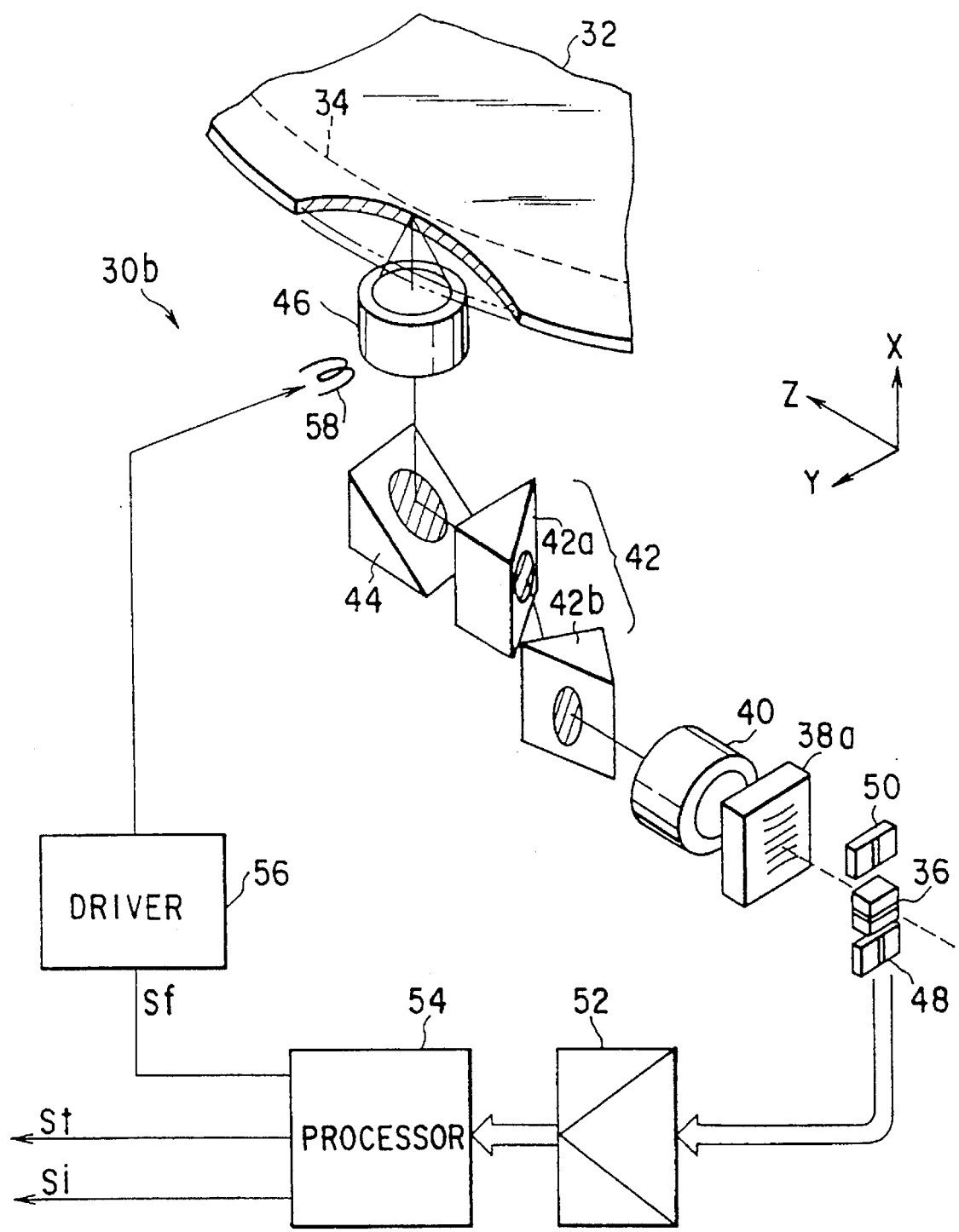
F I G. 7

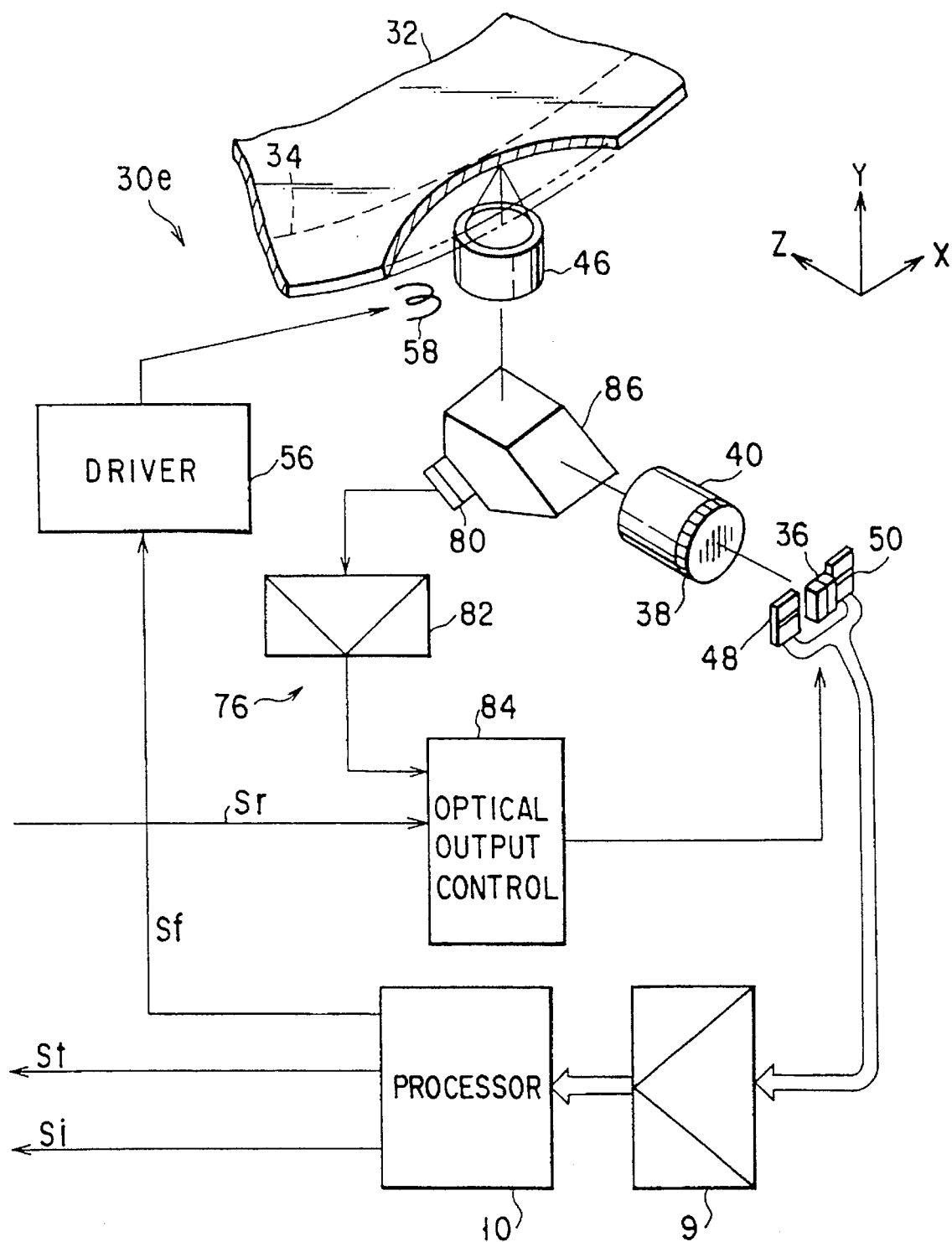
F I G. 12

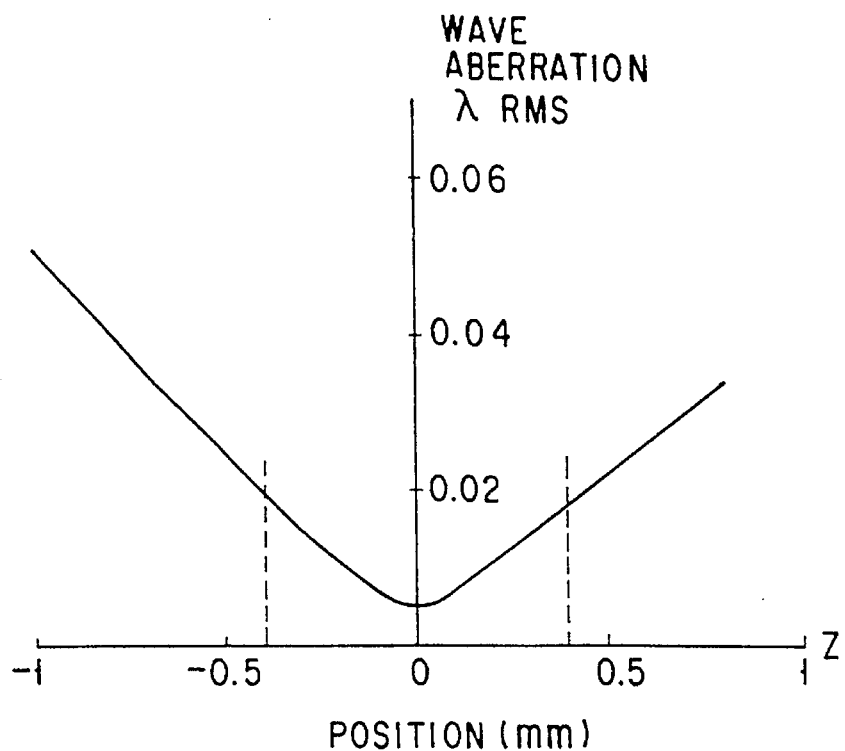
F I G. 16
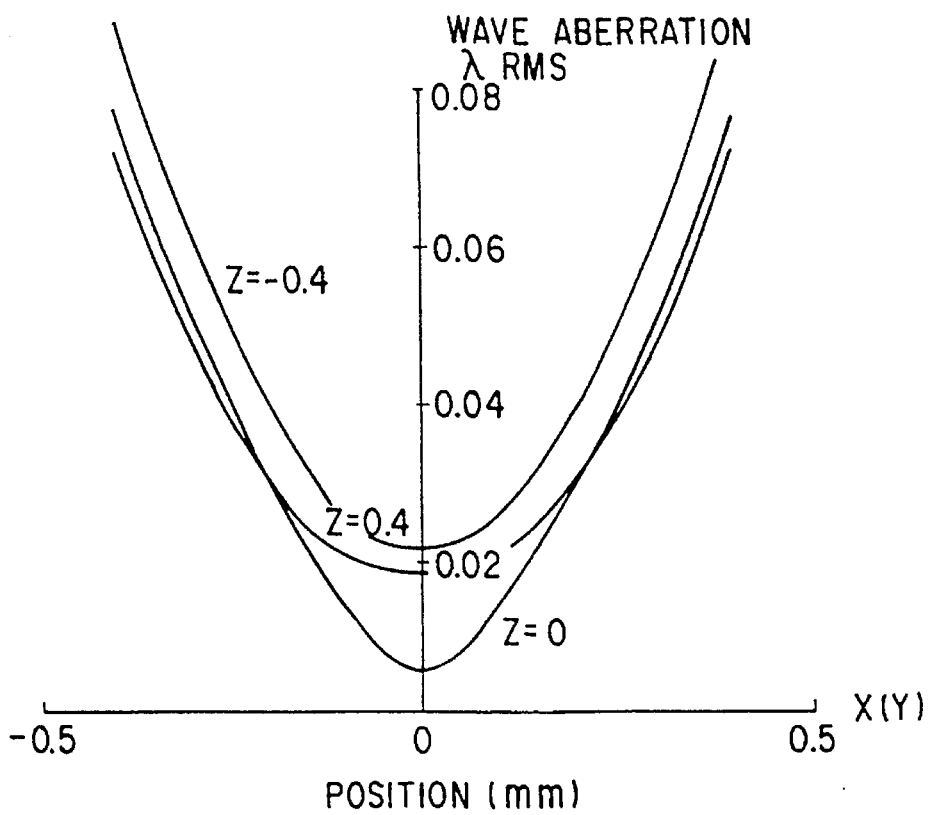
F I G. 17

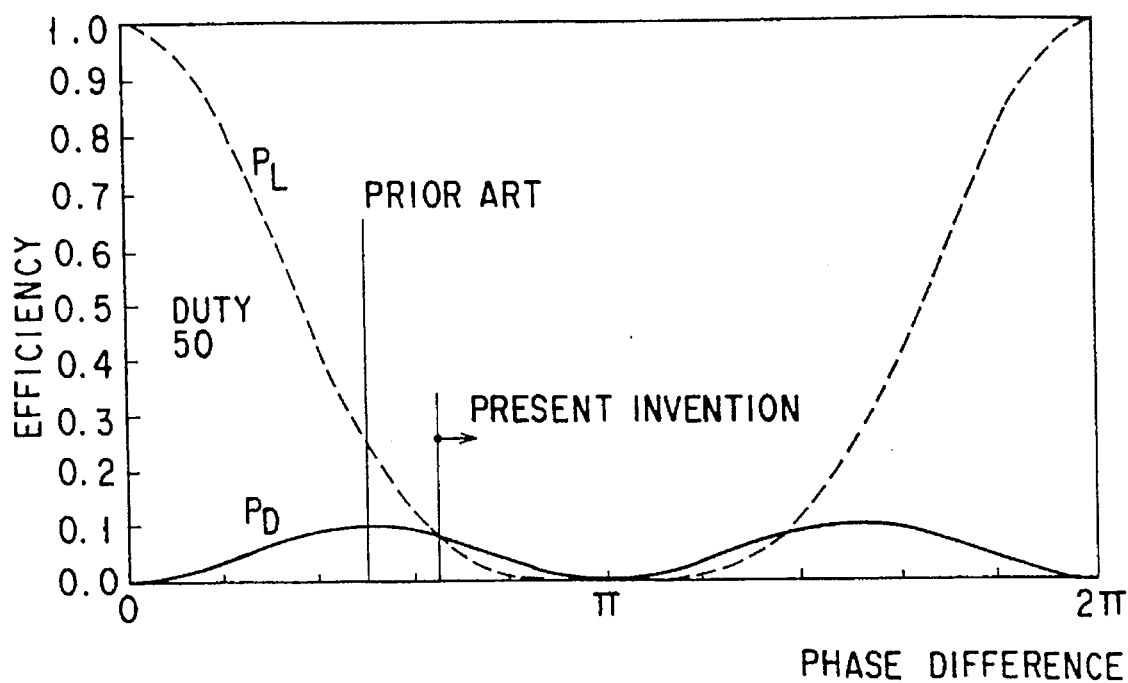
F I G. 21
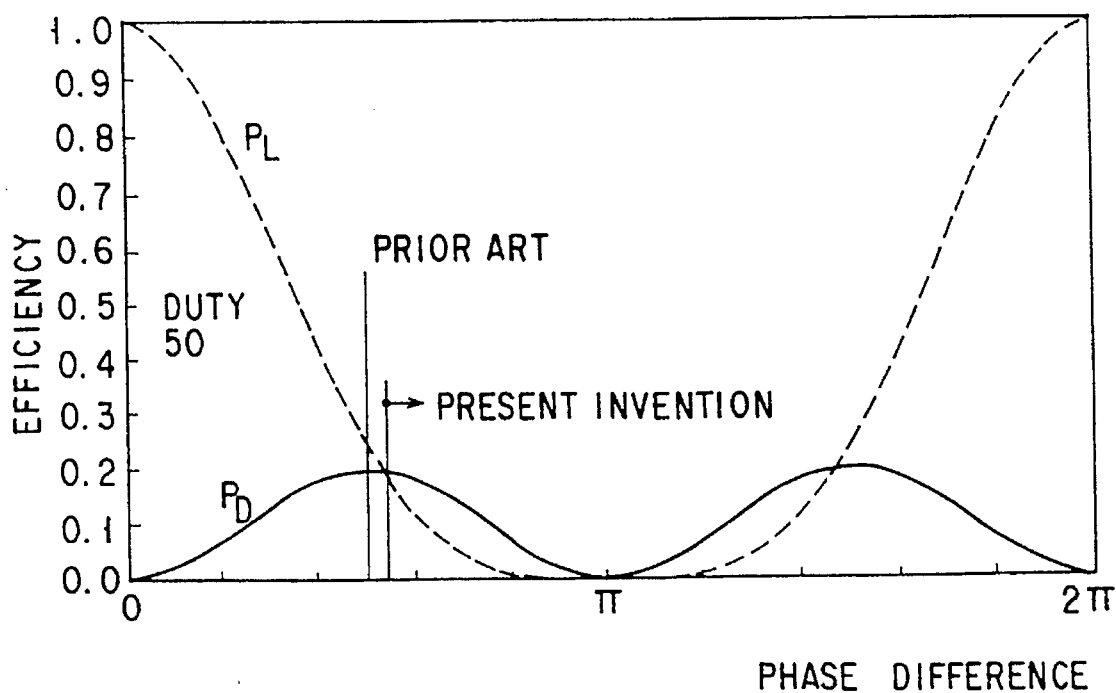
F I G. 22

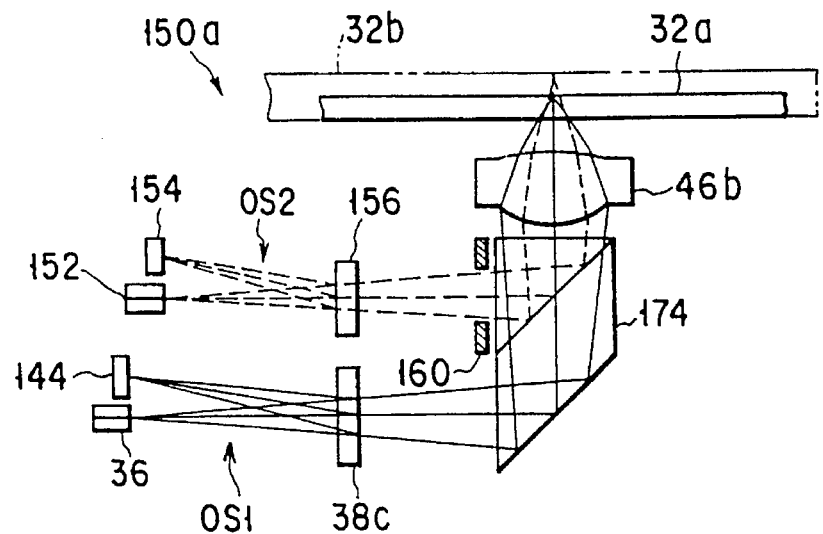
F I G. 27
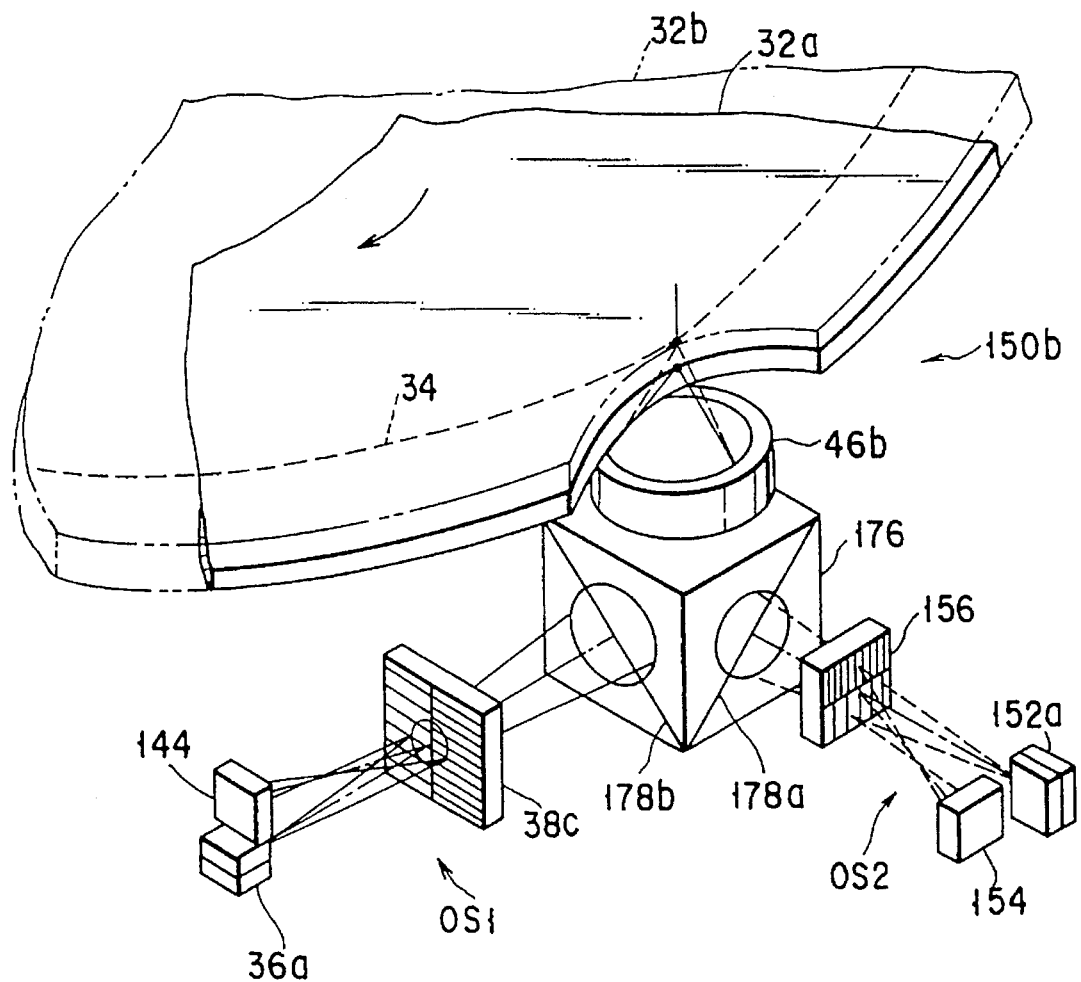
F I G. 28

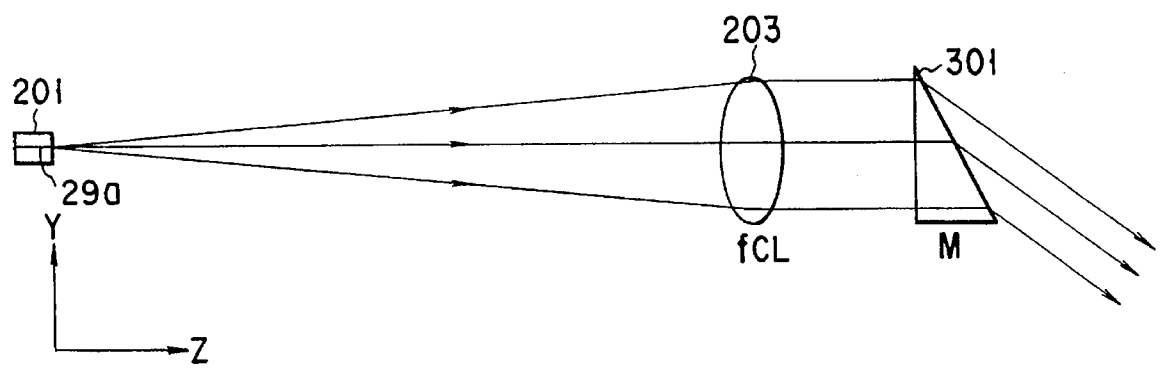
F I G. 30A
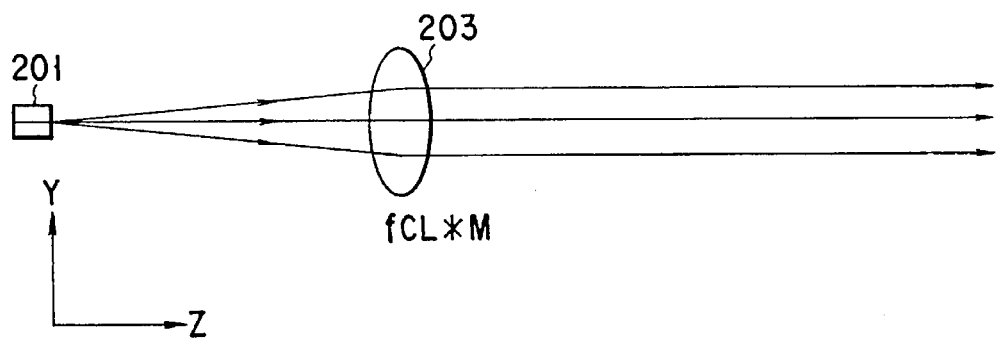
F I G. 30B
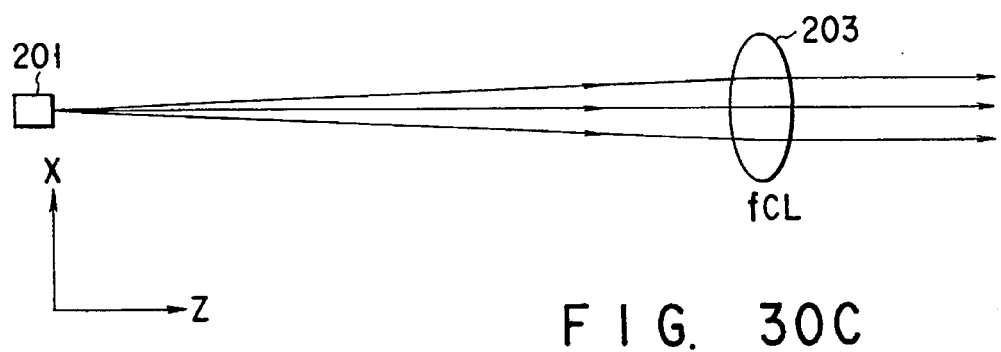
F I G. 30C

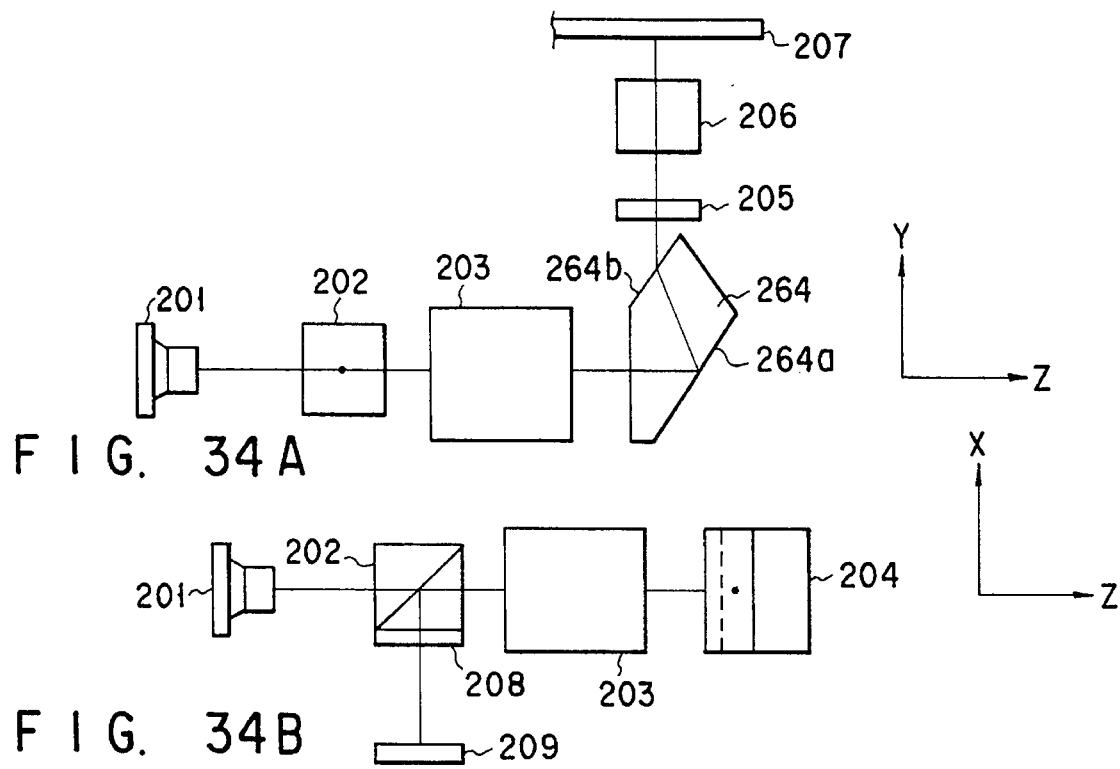
FIG. 34A
FIG. 34B
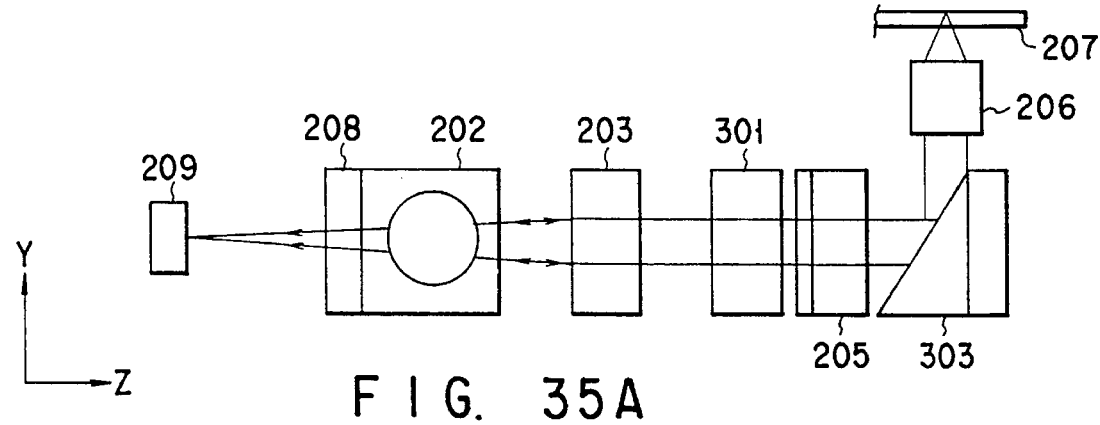
FIG. 35A
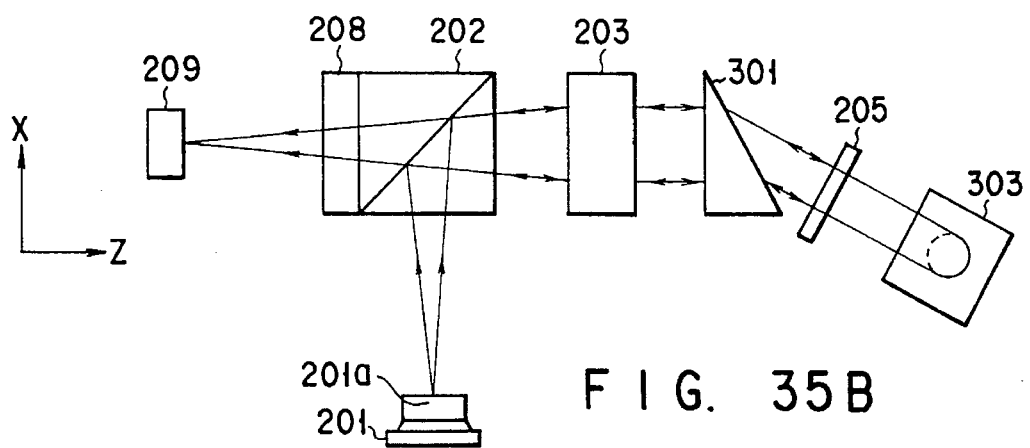
FIG. 35B

LIGHT BEAM SHAPING DEVICE TO CHANGE AN ANISOTROPIC BEAM TO AN ISOTROPIC BEAM FOR REDUCING THE SIZE OF AN OPTICAL HEAD

CROSS-REFERENCES TO THE RELATED APPLICATIONS

This application is a continuation-in-part of U.S. patent application Ser. No. 08/118,743 filed on Sep. 10, 1993, now abandoned.

BACKGROUND OF THE INVENTION

1. Field of the Invention

The present invention relates generally to a technique of controlling a light-emitting unit including light-emitting devices designed to send forth an optical information beam toward a target object, and, more particularly, to an optical information recording equipment including a light-source unit for providing a write beam representing information to an optical information storage medium. The invention also relates to a laser control system for use in an optical record and read/write apparatus employing a round disk-shaped photosensitive record carrier body detachably set therein.

2. Description of the Related Art

With the recent advances in the technology of semiconductor lasers as solid-state light-emitting elements, optical information recording/reproducing apparatuses including an optical head device using output laser light as a write beam or read beam are increasing in applicability. Typically, an optical head device includes a semiconductor laser as its light source. The optical head device also includes a driver circuitry for adjusting a bias current of the laser such that the output light of the laser is at a power level preselected in accordance with an operation mode, and an optical system for projecting the adjusted laser light onto a target recording medium in an in-focus state. The above-described constituent elements are packed into a small-sized housing at a high density.

As one of optical information record/reproduction apparatuses, digital audio information record/reproduction apparatuses are commercially important. An apparatus of this type is expected to be also used as a peripheral device such as an external storage unit of a computer system in the near future. As a digital audio information record/reproduction apparatus, there is known a recording/reproducing apparatus suitably used to record or play back information on or from a prerecorded optically accessible information-storage medium. Typically, a round disk-shaped record carrier body is rotatably set, as the above-mentioned recording medium, on the optical read apparatus. An optical head device is movably arranged in the radial direction of the rotating disk carrier body, and focuses a power-controlled read or write beam onto an optically detectable radiation sensitive layer of the disk carrier body. To do this, the device includes a forward optical path (light-transmitting system) for guiding a beam output from the laser to the disk carrier, and a reverse optical path (light-receiving system) for guiding light reflected by the disk carrier to a photodetector. Obviously, each of these light-transmitting and light-receiving systems is constituted by independent and distinct optical components. The photodetector performs photoelectric conversion to generate an electrical reproduction signal indicative of the read information.

As the demand for a decrease in the size of an optical recording/reproducing apparatus becomes stronger, an optical head device incorporated therein needs to be decreased in size. In order to decrease the size of the optical head device, it is especially important to reduce the number of components required, especially, those of light-transmitting and light-receiving optical system components. In order to meet this demand, attempts have been made to use optical components serving as both light-transmitting and light-receiving components or share optical components between the two systems.

Unfortunately, there is a trade-off in sharing optical components between the light-transmitting and light-receiving systems. If the transmission efficiency (influencing the light-use ratio) is improved and the imaging magnification is reduced, as is inherently required in the light-transmitting system, the performance of the light-transmitting system can be improved. In this case, however, the signal detection stability required for the light-receiving system is impaired, and the performance of the light-receiving system, which is inherently required to have a large imaging magnification, is degraded. Another way of saying this is that there is a decisive difference in the imaging magnification required between the light-transmitting and light-receiving systems. That is, the former is required to have a small imaging magnification, but the latter is required to have a large imaging magnification. These conflicting conditions pose a serious bar against sharing of optical components for a decrease in size. Therefore, if a conventional compact optical head device exclusively used for reproduction is simply designed to be also used as a recording optical device, the light-use ratio is decreased. In order to compensate for this, a laser having higher power must inevitably be used. This may undesirably lead to an increase in power consumption, an increase in size, and an increase in manufacturing cost.

SUMMARY OF THE INVENTION

It is therefore an object of the present invention to provide a new and improved optical head device for use in an optical record and read/write apparatus.

It is another object of the invention to provide a new and improved optical record and read/write apparatus employing a size-decreased optical head device for selectively providing a write beam and a read beam different in power from each other.

It is a further object of the invention to provide a new and improved optical record and read/write apparatus employing a small-sized optical head device for selectively providing a round disk-shaped record carrier body with a write beam and a read beam different in power from each other.

The above objects can be attained by a first optical head device adapted to be optically coupled to an information record carrier body.

The first optical head device comprises a light source for emitting a light beam having an anisotropic beam shape in a predetermined direction of an optical axis; a photodetector, provided on a surface perpendicular to the optical axis of the light source to be close to the light source, for detecting a change of a beam diameter in a predetermined direction; an objective lens, provided close to the information record carrier body, for converging spot light to the information record carrier body and receiving reflected light from the information record carrier body; collimating means, provided among the light source, the photodetector, and the objective lens, having at least a function of converting a light beam having an anisotropic beam shape to substantially a flux of parallel light; and beam shaping means, provided between the collimating means and the objective means, for at least approximating a characteristic of the light beam having an anisotropic beam shape to a characteristic of the light beam having an isotropic beam shape.

Also, the above objects can be attained by a second optical head device adapted to be optically coupled to an information record carrier body.

The second optical head device comprises a light source for emitting a light beam having an anisotropic beam shape in a predetermined direction of an optical axis; a photodetector, provided on a surface perpendicular to the optical axis of the light source to be close to the light source, having a plurality of divided photosensitive layers; an objective lens, provided close to the information record carrier body, for converging spot light to the information record carrier body and receiving reflected light from the information record carrier body; and holographic means, provided among the light source, the photodetector, and the objective lens, having a plurality of divided holograms.

Moreover, the above objects can be attained by a third optical head device adapted to be optically coupled to an information record carrier body.

The third optical head device comprises a light source for emitting a light beam having an anisotropic beam shape in a predetermined direction of an optical axis; a photodetector, provided on a surface perpendicular to the optical axis of the light source to be close to the light source, having a plurality of divided photosensitive layers; an objective lens, provided close to the information record carrier body, for converging spot light to the information record carrier body and receiving reflected light from the information record carrier body; and diffraction type optical element means, provided among the light source, the photodetector, and the objective lens, having a predetermined diffraction efficiency such that quantity of light (PL) showing that light emitted from the light source returns to the light source is made smaller than quality of light (PD) entered the photodetector, and a predetermined transmissivity.

Furthermore, the above objects can be attained by a fourth optical head device adapted to be optically coupled to a first and second information record carrier bodies.

The fourth optical head device comprises a first light source for emitting a light beam having an anisotropic beam shape in a predetermined direction of an optical axis; a first photodetector, provided on a surface perpendicular to the optical axis of the first light source to be close to the first light source, for detecting a change of a beam diameter in a predetermined direction; a second light source, provided at a position different from the first light source, for emitting a light beam having an anisotropic beam shape in a predetermined direction of an optical axis; a second photodetector, provided on a surface perpendicular to the optical axis of the second light source to be close to the second light source, for detecting a change of a beam diameter in a predetermined direction; an objective lens, provided close to each of the information record carrier bodies, for converging spot light to each information record carrier body and receiving reflected light from each information record carrier body; first diffraction type optical element means, provided among the first light source, the first photodetector, and the objective lens, having a predetermined diffraction efficiency such that quantity of light (PL) showing that light emitted from the first light source returns to the first light source is made smaller than quality of light (PD) entered the first photodetector, and a predetermined transmissivity; second diffraction type optical element means, provided among the second light source, the second photodetector, and the objective lens, having a predetermined diffraction efficiency such that quantity of light (PL) showing that light emitted from the second light source returns to the second light source is made smaller than quality of light (PD) entered the second photodetector, and a predetermined transmissivity; and beam splitter means, provided among the first and second diffraction type optical element means and the objective lens, for selectively inputting emission light from the first and second diffraction type optical element means in the objective lens so as to selectively input reflected light of beams outputted from the objective lens to the first and second diffraction type optical element means, respectively.

The above-mentioned first optical head device, which comprises the light source, the photodetector, the objective lens, the collimating means, and the beam shaping means, operates as follows.

More specifically, the light beam, which is emitted from the light source and which has the anisotropic beam shape, is incident onto the collimating means. The collimating means shapes the incident light beam into substantially a parallel flux of light. The light beam, which is converted to the parallel flux of light by the collimating means, is incident onto the beam shaping means. The beam shaping means shapes the incident light beam into an isotropic light beam. The light beam, which is converted to the isotropic light beam by the beam shaping means, is incident onto the objective lens. The objective lens transmits the spot light to the layer by the incident isotropic light beam. The reflected light, which is generated by the spot light transmitted to the information record carrier body, is incident onto the objective lens. The reflected light, which is incident onto the objective lens, is outputted from the objective lens and incident onto the beam shaping means. The reflected light, which is incident onto the beam shaping means, is outputted from the beam shaping means and incident onto the collimating means. The reflected light, which is incident onto the collimating means, is outputted from the collimating means, and reaches the photodetector. The photodetector detects the change of the beam diameter of the received reflected light in a predetermined direction.

As mentioned above, in the first optical head device, the light beam emitted from the light source is guided to the collimating means, beam shaping means, and objective lens. The reflected light sent from the information record carrier body is guided to the objective lens, beam shaping means, collimating means, and the photodetector. In this case, the most significant feature of the first optical head device is that the reflected light sent from the information record carrier body passes through the beam shaping means in a direction, which is opposite to a forward optical path direction (advancing direction of the light beam emitted from the light source), and returns to the collimating means.

Moreover, the beam shaping means has a function of shaping the light beam having anisotropic beam shape emitted from the light source into the isotropic beam. In the case that a semiconductor laser is used as a light source, this function is used to expand a direction, which is parallel to an active layer of the semiconductor laser in the light beam. It is assumed that a focal distance of the collimating means is fc1 and a beam collimating rate is M, the optical system comprising the collimating means and the beam shaping means is substantially equal to the lens, which has a focal distance of fc1×M, in its function. Therefore, since the photodetector can perform the photodetection through the lens having a distance of fc1×M, the focal and tracking control can be realized with high accuracy, and a highly accurate regeneration signal can be obtained.

The above-mentioned second optical head device, which comprises the light source, the photodetector, the objective lens, and the holographic means, operates as follows.

More specifically, the light beam, which is emitted from the light source and which has the anisotropic beam shape, is incident onto the holographic means. The light beam, which is incident onto the holographic means, is incident onto the objective lens. The objective lens transmits the spot light to the information record carrier body by the incident light beam. The reflected light, which is generated by the spot light transmitted to the information record carrier body, is incident onto the objective lens. The reflected light, which is incident onto the objective lens, is outputted from the objective lens and incident onto the holographic means. The reflected light, which is incident onto the holographic means, is divided into a plurality of light beams by a plurality of divided holograms formed in the holographic means, and these light beams are outputted from the holographic means, and reach the photodetector. The photodetector detects the plurality of light beams formed by the holographic means, respectively since the photodetector has s a plurality of photosensitive areas.

As mentioned above, in the second optical head device, the light beam emitted from the light source is guided to the holographic means, and objective lens. The reflected light sent from the information record carrier body is guided to the objective lens, holographic means, and the photodetector. In this case, the most significant feature of the second optical head device is that the reflected light sent from the information record carrier body passes through the holographic means in a direction, which is opposite to a forward optical path direction (advancing direction of the light beam emitted from the light source), and returns to the holographic means.

Moreover, since the plurality of holograms are formed in the holographic means, the reflected light, which is incident onto the holographic means, is divided into the plurality of light beams, and these light beams can be detected by the photodetector having the plurality of photosensitive areas. Then, the focal and tracking control can be realized with high accuracy, and a highly accurate regeneration signal can be obtained.

The above-mentioned third optical head device, which comprises the light source, the photodetector, the objective lens, and the diffraction type optical element means, operates as follows.

More specifically, the light beam, which is emitted from the light source and which has the anisotropic beam shape, is incident onto the diffraction type optical element means. The light beam, which is incident onto the diffraction type optical element means, is incident onto the objective lens. The objective lens transmits the spot light to the information record carrier body by the incident light beam. The reflected light, which is generated by the spot light transmitted to the information record carrier body, is incident onto the objective lens. The reflected light, which is incident onto the objective lens, is outputted from the objective lens and incident onto the diffraction type optical element means. The reflected light, which is incident onto the diffraction type optical element means, is outputted from the diffraction type optical element means, and reaches the photodetector. The diffraction type optical element means has a predetermined diffraction efficiency such that a return quantity of light (PL) returning to the light source is smaller than quality of light (PD) incident onto the photodetector, and a predetermined transmissivity. Due to this, the detection of the reflected light can be performed by the photodetector under a condition that a variation of the light output of the light source, which caused by the return quantity of light (PL), is small.

As mentioned above, in the third optical head device, the light beam emitted from the light source is guided to the diffraction type optical element means, and objective lens. The reflected light sent from the information record carrier body is guided to the objective lens, the diffraction type optical element means, and the photodetector. In this case, the most significant feature of the third optical head device is that the reflected light sent from the information record carrier body passes through the diffraction type optical element means in a direction, which is opposite to a forward optical path direction (advancing direction of the light beam emitted from the light source), and returns to the diffraction type optical element means.

Moreover, if the diffraction efficiency of the diffraction efficiency element means is increased and transmissivity is decreased, the return quantity of light (PL) returning to the light source can be considerably reduced, whereby the variation of the light output of the light source, which is caused by the return quantity of light (PL), can be made small, and a S/N ratio of a reproduction information signal can be increased.

The above-mentioned fourth optical head device, which comprises the light sources, the photodetectors, the objective lens, the first and second diffraction type optical element means, and beam splitter, operates as follows.

More specifically, the light beam, which is emitted from the first light source and which has the anisotropic beam shape, is incident onto the first diffraction type optical element means. The light beam, which is incident onto the first diffraction type optical element means, is incident onto the objective lens. The objective lens transmits the spot light to the information record carrier body by the incident light beam. The reflected light, which is generated by the spot light transmitted to the information record carrier body, is incident onto the objective lens. The reflected light, which is incident onto the objective lens, is outputted from the objective lens and incident onto the first diffraction type optical element means. The reflected light, which is incident onto the first diffraction type optical element means, is outputted from the first diffraction type optical element means, and reaches the first photodetector. On the other hand, the light beam, which is emitted from the second light source and which has the anisotropic beam shape, is incident onto the second diffraction type optical element means. The light beam, which is incident onto the second diffraction type optical element means, is incident onto the objective lens. The objective lens transmits the spot light to the information record carrier body by the incident light beam. The reflected light, which is generated by the spot light transmitted to the information record carrier body, is incident onto the objective lens. The reflected light, which is incident onto the objective lens, is outputted from the objective lens and incident onto the second diffraction type optical element means. The reflected light, which is incident onto the second diffraction type optical element means, is outputted from the second diffraction type optical element means, and reaches the second photodetector.

The first and second diffraction type optical element means have a predetermined diffraction efficiency such that a return quantity of light (PL) returning to the light source is smaller than quality of light (PD) incident onto the photodetector, and a predetermined transmissivity. Due to this, the detection of the reflected light can be performed by the first and second photodetectors under a condition that a variation of the light outputs of the first and second light sources, which is caused by the return quantity of light (PL), is small.

As mentioned above, in the fourth optical head device, the first and second photodetectors can transmit the light beams, which are emitted from the first and second light sources, to the information record carrier bodies of the first and second information record carrier bodies, respectively. Also, the first and second photodetectors can receive the reflected light from the respective information record carrier bodies. In this case, one of the features of the fourth optical head device is that the reflected light sent from the information record carrier bodies passes through the first and second diffraction type optical element means in a direction, which is opposite to a forward optical path direction (advancing direction of the light beam emitted from the light source), and returns to the first and second diffraction type optical element means.

Moreover, if the diffraction efficiency of the first and second diffraction efficiency element means is increased and transmissivity is decreased, the return quantity of light (PL) returning to the light source can be considerably reduced, whereby the variation of the light output of the first and second light source, which is caused by the return quantity of light (PL), can be made small, and a S/N ratio of a reproduction information signal can be increased.

The foregoing and other objects, features, and advantages of the invention will become apparent from the following more particular description of preferred embodiments of the invention, as illustrated in the accompanying drawings.

BRIEF DESCRIPTION OF THE DRAWINGS

FIG. 5 illustrates, in plan views of the photodetectors, the major steps of a focus control operation of these photodetectors, side by side;

FIGS. 7 to 9 and 12 show other embodiments of the invention.

FIGS. 16 and 17 are graphic representations of wavefront aberration along different directions in the optical system of FIG. 13;

FIGS. 20 to 22 are graphic representations of the optical characteristic of a holographic device used in the device of FIG. 18;

FIGS. 27 and 28 show optical head devices in accordance with further embodiments of the invention.

FIG. 29A is a side view, and FIG. 29B is an upper surface view;

FIGS. 30A, 30B, and 30C show a function of a beam shaping prism of the optical system of FIGS. 29A and 29B, respectively; FIG. 30A is a cross sectional view of the optical system of a surface parallel to an active layer of a semiconductor laser, FIG. 30B is a cross sectional view of the optical system equivalent to the optical system of FIG. 30A;

FIG. 33A is a side view and FIG. 33B is an upper view;

FIGS. 34A and 34B show an embodiment having other beam shaping prism, and FIG. 34A is a side view, and FIG. 34B is an upper view;

FIGS. 35A and 35B show an embodiment having other optical head, and FIG. 35A is a side view, and FIG. 35B is an upper view;

DETAILED DESCRIPTION OF THE PREFERRED EMBODIMENTS

Figure 1:
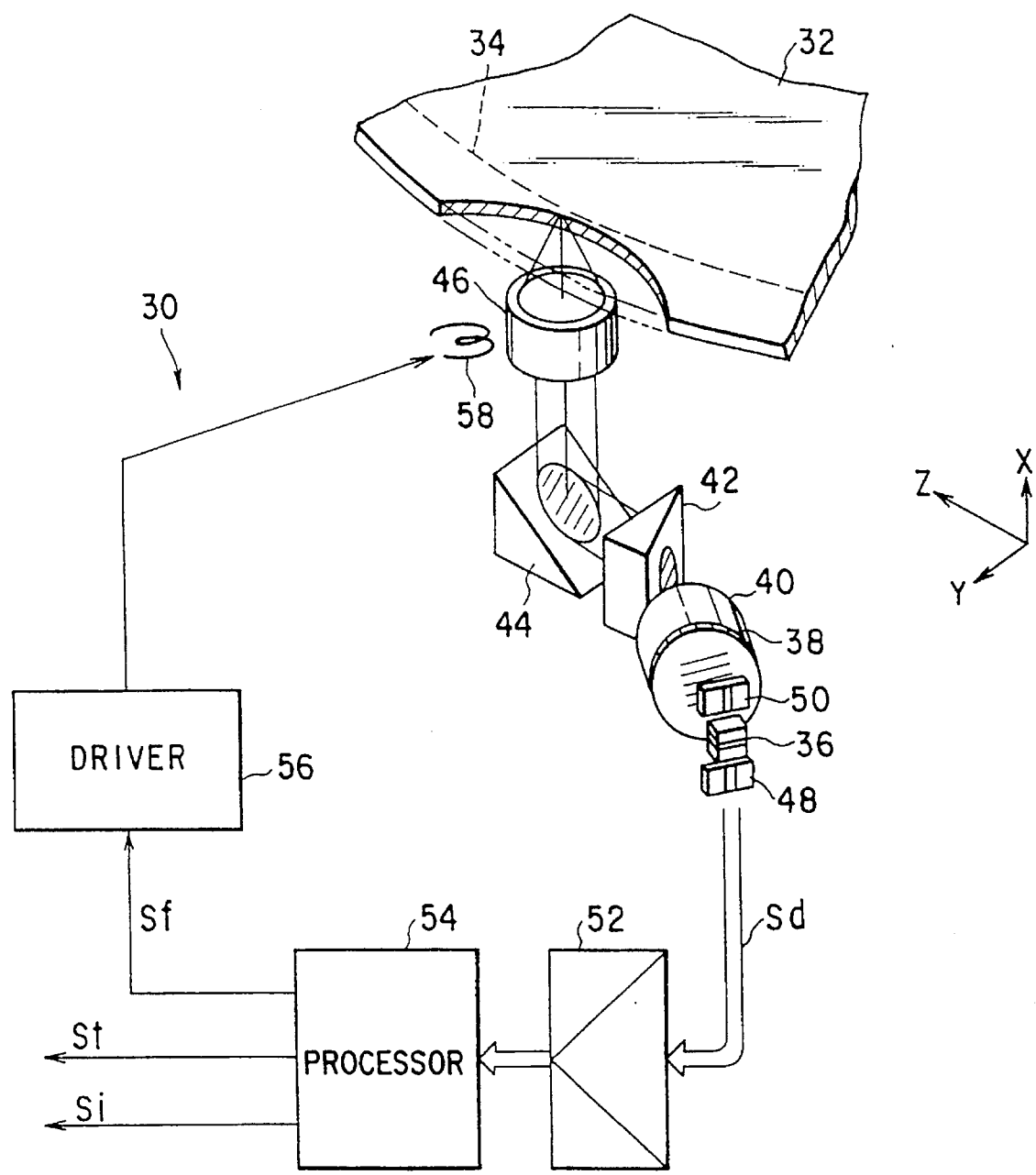
FIG. 1 is a diagram schematically showing the overall configuration of an optical head device in accordance with one preferred embodiment of the invention.

Referring to FIG. 1, an optical head device in accordance with one preferred embodiment of the present invention is generally designated by the numeral 30. The optical head device 30 selectively provides a write beam or read beam being different in power from each other to a round disk-shaped record carrier body 32 for use in an optical record and read/write apparatus. The record carrier 32 will be referred to as an "optical disk" hereinafter, which is detachably and rotatably set in a disk support mechanism (not shown) in a known manner, and is rotated with the aid of a known spindle (not shown) which is driven by a rotary motor (not shown).

The optical disk 32 may be an optical disk having a base layer and a radiation sensitive layer stacked thereon, onto which digital audio information is recordable and readable by optical means. As shown in FIG. 1, an optically detectable spiral beam-guide track 34 covering the entire surface area of disk 32 is formed on its radiation layer. Guide track 34 may alternatively be a plurality of concentric tracks.

The optical head device 30 includes a semiconductor laser device 36 as a write/read light source. Laser 36 emits or sends forth a controlled light beam in accordance with a bias current supplied by a laser driver associated with laser 36. This output laser light travels toward the radiation sensitive layer of the optical disk 32 along an optical path extending through a holographic optical element (HOE) 38, a collimator lens 40, a beam-shaping prism 42, a mirror 44, and an objective lens 46. This optical path serves both as a forward optical path (light-transmission path) and a reverse optical path (light-reception path) of laser light. A pair of solid-state photodetector devices 48 and 50 are arranged on a vertical plane including laser 36. These photodetectors are optically coupled to HOE 38 so that the photodetectors receive light reflected from disk 32 and respectively generate electrical detection signals Sd indicative of light respectively input to the photodetectors.

The photodetectors 48, 50 are electrically connected to a known amplifier circuit 52. Amplifier 52 is coupled to an operational processing circuit 54. The processor unit 54 has three outputs: a focus-error signal output Sf, a tracking error signal output St and a reproduced information signal output Si. Processor 54 is connected to a driver circuit 56, causing the focus-error signal to be fed thereto. Driver 56 is connected to an inductive element 58, such as a known coil, which acts as a lens actuator that is responsive to a drive signal Sdrv supplied by driver 56. Actuator 58 adjusts the position of the lens 46 by moving it so that the light beam is just focused onto the target surface of optical disk 32. Driver 56 will be called the "lens-actuator" or "actuator driver" hereinafter.

The semiconductor laser 36 emits a light beam having an anisotropic beam profile, such as an elliptical beam shape. This laser beam (i.e., read light) enters the collimator lens 40. Collimator lens 40 collimates the laser beam into a parallel light beam. The resultant light is reshaped by the beam-shaping prism 42 to have an isotropic beam profile. Thereafter, the light beam is reflected by the mirror 44 toward the objective lens 46 vertically upward (indicated by "X" in FIG. 1). The shape-adjusted laser beam is then focused by lens 46 on the recording surface of the radiation sensitive layer of the rotating optical disk 32, thereby forming a fine beam spot thereon.

The light reflected from the recording surface of the optical disk 32 propagates along the same optical path as the forward optical path of the optical head device 30 in the opposite direction and enters the pair of photodetectors 48, 50. More specifically, the reflected light (play-back light) indicative of a reproduced information is guided to HOE 38 through the objective lens 46, the mirror 44, the beam-shaping prism 42, and the collimator lens 40. HOE 38 diffracts the play-back light incident thereon. The diffracted play-back light is deflected in a direction different from that of the incident light beam. As a result, the play-back light is split into first and second diffracted light components. These first and second light components are deflected light in the positive (+) direction and deflected light in the negative (−) direction, respectively. The deflected light in the positive (+) direction and the deflected light in the negative (−) direction are respectively guided to photodetectors 48, 50, which then generate corresponding electrical detection signals Sd(+), Sd(−), respectively.

The detection signals Sd(+), Sd(−) are supplied to the amplifier circuit 52. Amplifier 52 amplifies each of the detection signals Sd to a predetermined proper level. The amplified detection signals are then input to the processor circuit 54, which performs known predetermined processing with respect to these signals to generate at its three outputs a focus-error signal Sf, a tracking error signal St and a play-back information signal output Si.

The focus-error signal Sf is supplied to the lens actuator driver circuit 56. In response to the focus-error signal Sf, the driver 56 adjusts a drive current supplied to the focus drive coil 58, so that coil 58 causes the objective lens 46 to move in the optical axis direction (the X direction perpendicular to the rotating surface of the disk 32) so as to compensate for a focus error, if any.

The significant feature of the optical head device 30 is as follows. Light reflected by the recording surface of the optical disk 32 propagates in the reverse direction along the same optical path as the forward optical path of the optical system of the device, and is guided to be incident on the collimator lens 40. While a laser beam is transmitted, the beam-shaping prism 42 serves to expand incident light in only one axial direction. The optical characteristics of collimator lens 40 and of beam-shaping prism 42 are shown in FIGS. 2A to 2C.

Figure 2A:
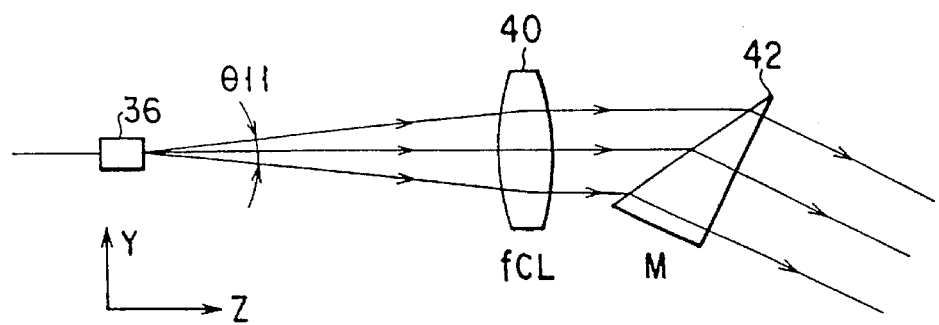
FIGS. 2A to 2C are illustrations showing models of an optical system including a collimator lens and a beam-shaping prism of FIG. 1.

First, see FIG. 2A, which illustrates a model of the optical system associated with the collimator lens 40 and the beam-shaping prism 42 within a plane (Y-Z plane) parallel to an active layer 37 formed in the semiconductor laser 36. Anisotropic (elliptical) light beams are emitted from the active layer 37 of laser 36. The divergence angle of the output beams of laser 36 is represented by θ 11. Let "fcL" and "M" be the focal length of collimator lens 40 and the beam collimating ratio, respectively. As shown in FIG. 2A, laser 36 and lens 40 are arranged on the same optical axis (Z direction). The output light of collimator lens 40 has parallel rays. The beam-shaping prism 42 is arranged to be inclined at a predetermined angel with respect to the optical axis.

Figure 2B:
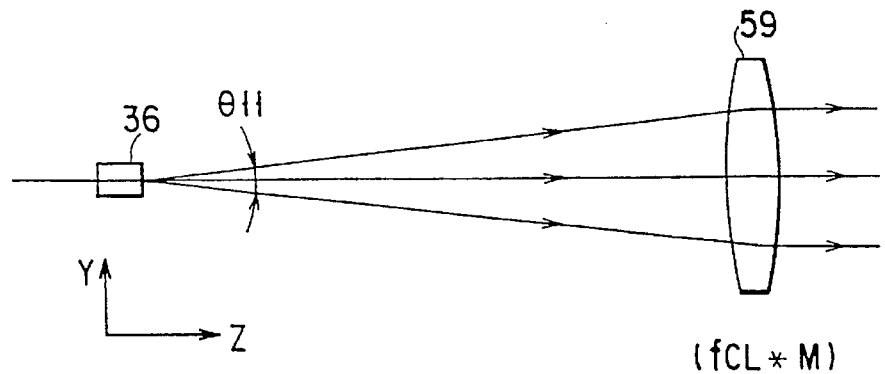
Figure 2C:
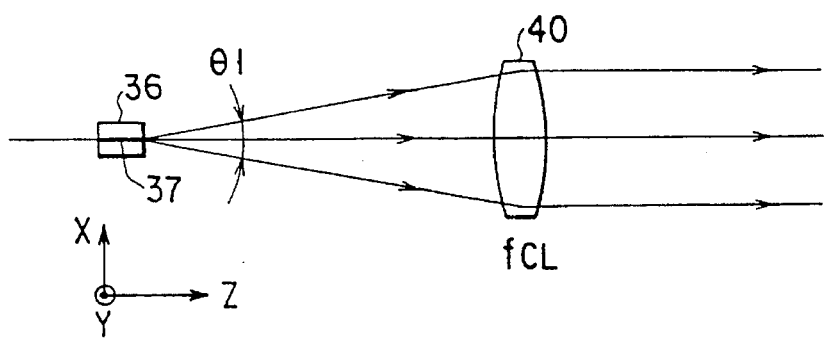

An optical system equivalent to the optical system of FIG. 2A is shown in FIG. 2B, which replaces the collimator lens 40 and the beam-shaping prism 42 of FIG. 2A with one equivalent characteristic lens 59. This lens 59 has a focal length denoted by reference symbol "fcL*M." FIG. 2C shows an optical system on another plane perpendicular to the active layer 37 of the laser 36 in FIG. 2A (i.e., the X-Z plane perpendicular to the Y-Z plane). On the X-Z plane, output laser light is completely free from the effect of beam-shaping prism 42. Therefore, as shown in FIG. 2C, the state of the optical system is equivalent to the state wherein only a collimator lens 40 is present. Note that, when the detection of a focus error on the optical disk 32 is done by detecting a beam size along the Y-axis direction parallel to active layer 37, it becomes equivalent to a state that a lens having the focal length fcL*M is used as the detection lens.

Figure 3:
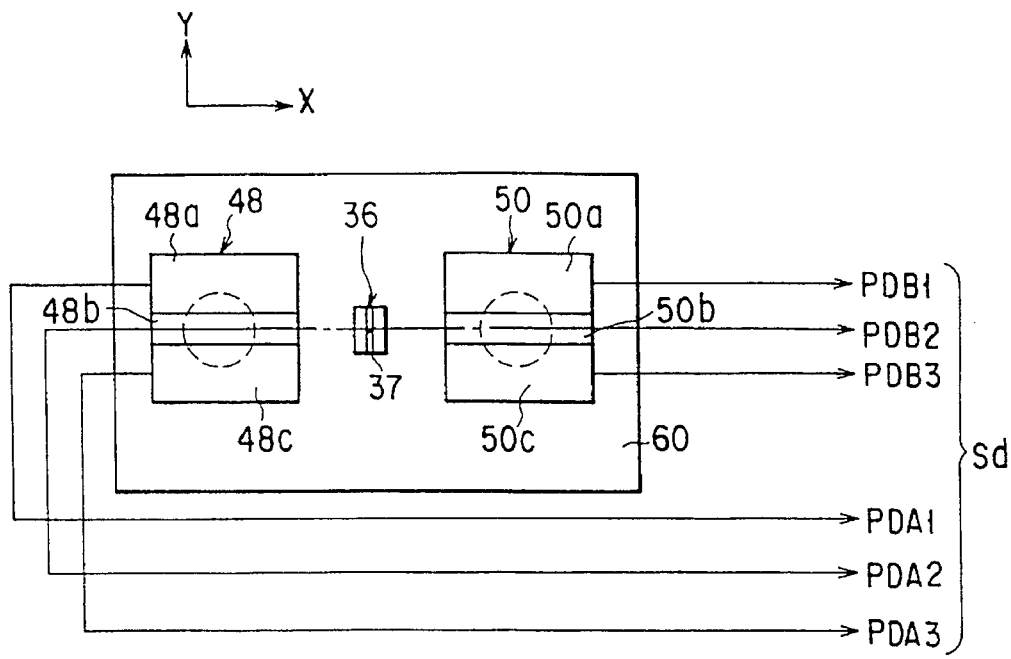
FIG. 3 shows the plan view of an assembly including a laser light-source and photodetectors of FIG. 1.
Figure 4:
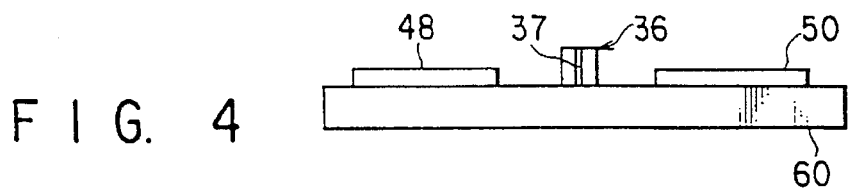
FIG. 4 is a side view of the assembly of FIG. 3.

The laser light-source 36 and the photodetectors 48, 50 of FIG. 1 are arranged on a support plate 60, as shown in FIGS. 3 and 4. Photodetectors 48, 50 are separated from each other to define a predetermined gap therebetween. The laser 36 is located in the middle of the center line of photodetectors 48, 50. A tree-divided light-sense type photodetector is used as each photodetector 48, 50. Photodetector 48 has three photosensitive areas 48a, 48b, 48c, whereas photodetector 50 has three photosensitive areas 50a–50c. The active layer 37 of laser 36 is perpendicular to the surface of the support plate 60 (i.e., the X-Y plane); layer 37 is also perpendicular to the center line for connecting photodetectors 48, 50 to each other. When the laser active layer 37 is parallel to the Y axis, the pair of photodetectors 48, 50 are aligned along the X axis. The photosensitive area of each photodetector 48, 50 is divided into three sub-areas by division lines parallel to the X axis. With the embodiment, it becomes possible to detect, by using one detection lens of the focal length fcL*M, any variations in the size (cross-sectional shape) of a laser beam be to be caused by focus errors.

The three subdivided photosensitive areas 48a–48c of the photodetector 48 of FIG. 3 generate electrical detection signals PDA1, PDA2, PDA3 indicative of the detection results, respectively. The three subdivided photosensitive areas 50a–50c of the photodetector 50 generate electrical detection signals PDB1, PDB2, PDB3 indicating the detection results, respectively. In this case, the focus-error signal Sf, the tracking error signal St and the play-back information signal Si of FIG. 1 are represented by the following equations:

$$Sf = \{PDA2 - (PDA1 + PDA3)\} - \{PDB2 - (PDB1 + PDB3)\}, \quad (1)$$

$$St = (PDA1 - PDA3) - (PDB1 - PDB3), \quad (2)$$

$$Si = (PDA1 + PDA2 + PDA3) + (PDB1 + PDB2 + PDB3). \quad (3)$$

The processor unit 54 of FIG. 1 calculates Equations 1 to 3 to generate the respective signals Sf, St, Si.

The holographic optical element (HOE) 38 sets the azimuth of a diffraction grating formed on its surface in such a manner as to provide the diffraction in a direction perpendicular to the active-layer junction plane of the light-source laser 36. HOE 38 also exhibits some light-condensing function with respect to the diffracted light for the purpose of focus error detection. With the light-condensing function, a light beam condensed in front of the detection plane is incident on the photodetector 48 for detecting diffracted light in the positive (+) direction; a light beam condensed at a position slightly behind the detection plane is incident on the other photodetector 50.

FIG. 5 shows, side by side, the projected patterns of incident light beams introduced onto the first and second photodetectors 48, 50 in different focused states. The numeral 62 denotes an in-focus state, wherein light beam patterns on the two photodetectors 48, 50 are almost the same in that the incident light is radiated on the three divided photosensitive areas 48a–48c (50a–50c) of each photodetector.

As the objective lens 46 of FIG. 1 comes closer to the recording surface of the disk 32 as shown by an arrow 64 in FIG. 5, the photodetectors 48, 50 become different from each other in their projected beam patterns. In photodetector 48, a light beam incident on the upper and lower photosensitive areas 48a, 48c increases in amount as compared with the case of the focus state 62. As the objective lens 46 goes far from the recording surface of the disk 32, the light beam patterns on photodetectors 48, 50 change in the reverse manner to that described above. More specifically, as lens 46 is moved far from the recording surface of disk 32 as indicated by an arrow 66 in FIG. 5, a light beam incident on the upper and lower photosensitive areas 50a, 50c of photodetector 50 increases in amount as compared with the case of the in-focus state 62. Meanwhile, in photodetector 48, the incident beam pattern is reduced in the first step, and light is incident on only the middle photosensitive area 48b. Subsequently, as lens 46 is further moved from disk 32, a light beam on the three divided areas 48a–48c increases again in amount.

Another way of saying this is that the incident-beam formation pattern characteristics of the photodetectors 48, 50 are reverse to each other in relation to the distance between the objective lens 46 and the disk 32. In this embodiment, when lens 46 passes the position of an in-focus state to come too close to disk 32, the pattern of light incident on photodetector 48 increases in area, while that of photodetector 50 decreases. As lens 46 is distant far from the position of the in-focus state and from disk 32, the area of light-incident pattern on photodetector 48 decreases, while that of photodetector 50 increases. Note that the incident beam pattern on the three photosensitive areas 48a–48c (50a–50c) of each of photodetectors 48, 50 differs depending on whether the pattern is viewed from the direction in which these photosensitive areas are aligned or from a direction perpendicular thereto. As described previously with reference to FIGS. 2A to 2C, such a difference is based on the fact that the detection of light is performed by using lenses which are equivalently different in focal length from each other.

The significance of the embodiment 30 is that, when reflected light (information-read light) from the optical disk 32 propagates reversely along the same optical path as the forward optical path, the reflected light is forced to pass through the beam-shaping prism 42 and enter the photodetectors 48, 50. Specifically, the light reflected from the optical disk 32 travels along the same optical path in the direction reverse to the forward optical path, and passes through the objective lens 46 and beam-shaping prism 42. Thereafter, the light propagates in an optical path different from the forward optical path to be incident on photodetectors 48, 50. Since the light reflected by optical disk 32 is detected through beam-shaping prism 42, even if the focal length (fcL*M) of the detection lens is decreased by such a degree that may correspond to the beam-shaping magnification of prism 42, a focus error on disk 32 can be detected at almost the same detection magnification as that of a conventional detection lens having a long focal length. This means that the size of the optical system required can be reduced accordingly. Therefore, it is possible to achieve an improved stability in signal detection required for the light-receiving system, while maintaining an excellent performance (light-use ratio and the like) of the light-transmitting system having a signal optical path. This may be a great boon to the size-reduction or miniaturization of an optical recording/reproducing apparatus.

More specifically, the prism 42 acting as the beam-shaping functional element shapes or modifies the profile of an incident light beam emitted from the light-source laser 36 to provide an isotropic beam shape, by enlarging it in the direction along which the divergence angle is relatively small. For the focusing/tracking-error detection, the photodetectors 48, 50 are arranged so that they detect variations in the beam shape of a reflected light from the optical disk 32 in the same direction. To attain a further improved converging ratio (that is, an enhanced light-use ratio as defined with the minimum light output and the maximum temperature increase on the recording surface of an optical disk) of a light-source laser beam on the recording layer of optical disk as required in optical head devices with a recording function, the collimator lens 40 and beam-shaping prism 42 are arranged in the light transmitting system. With such an optical system, in case the reflected light from disk 32 propagates along the same path in the reverse direction toward laser 36, beam-shaping prism 42 performs a reduction function in the reverse optical path if it effects an enlargement function in the forward optical path; therefore, with respect to this beam-shaping direction, the apparent focal length of collimator lens 40 increases by a certain magnification which may correspond to the beam-shaping magnification (the diameter ratio of an incident light versus output light).

As has been described previously, the beam-shaping direction is incident with a specific direction along which the divergence angle of the light output of the light-source laser 36 is relatively small; in a case where the focal length is detected by detecting variations in the beam diameter of a disk-reflected light by using the photodetectors 48, 50, the results may be equivalent to a situation that the focal length detection is carried out by using an optical lens which is greater in focal length than the collimator lens 40. Therefore, even when a collimator lens of a shorter focal-length is employed to serve also as the converging lens in the detection system, it becomes possible to equivalently accomplish an increased detection magnification (which is a square value of the focal-length ratio of the converging lens in the detection system and the objective lens 46). A stably operable detection optical system can thus be accomplished. Most optical components may be common between the light transmitting system and the light receiving system in the same optical system, causing the total number of components required to decrease successfully. It is thus possible to attain a high-reliability/small-size optical head device.

In reduction of the present invention to practice, the above-described optical head device 30 can be variously modified. For example, as the collimator lens 40, a lens having a relatively long focal length can be employed. In the beam-shaping prism 42, a parallel light beam output from this collimator lens is subjected to a process of reducing a light beam component perpendicular to the laser active layer 37, whereby collimated light having a small divergence angle and propagating in a direction parallel to active layer 37 of light-source laser 36 can be properly matched with the aperture of objective lens 46. In this case, a focus error is also detected by detecting a change in the diameter of a light beam parallel to active layer 37.

Figure 6:
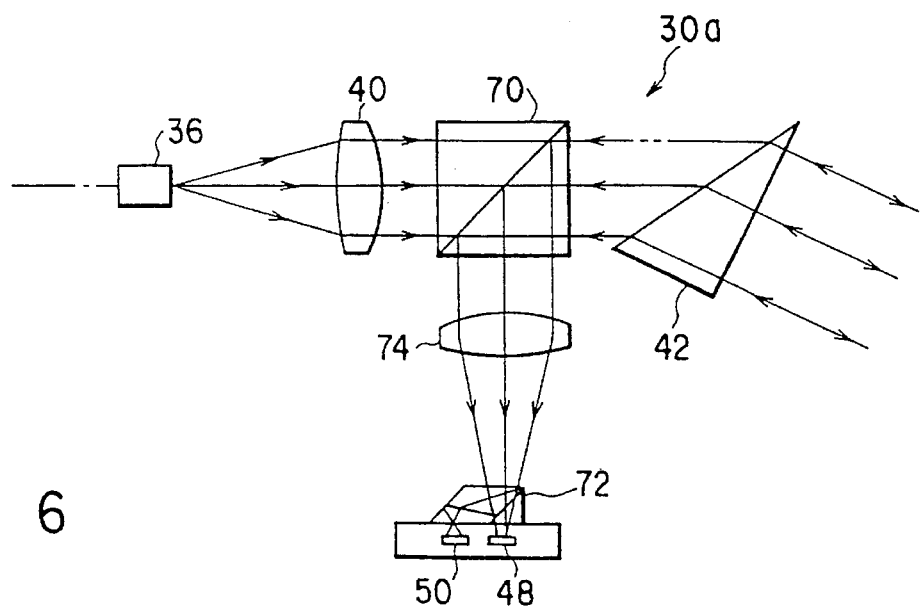
FIG. 6 shows a modification of the main optical system of the embodiment shown in FIG. 1.

An optical head device 30a shown in FIG. 6 is similar to that of FIG. 1 with two beam splitter devices 70, 72 being added causing an output light of a beam splitter 70 to reach the other beam splitter 72 by way of a detection lens 74. More specifically, the first beam splitter 70 is arranged between the collimator lens 40 and the beam-shaping prism 42. Beam splitter 70 receives light reflected by the disk 32 of FIG. 1 and guides it toward detection lens 74. Lens 74 is equivalent to the collimator lens 40 in optical characteristics such as focal length. A light beam condensed or converged by lens 74 enters the other beam splitter 72. Beam splitter 72 divides the incident beam into two beams, which are then projected onto the photodetectors 48, 50, respectively. With the embodiment, the same technical advantages as those described above can be obtained.

Another optical head device 30b shown in FIG. 7 is similar to that of FIG. 1 with (1) the beam-shaping prism 42 being modified to include a plurality of beam-shaping prisms 42a, 42b, and (2) the holographic optical element (HOE) 38 being replaced with an HOE 38a that is spaced apart from the collimator lens 40.

Figure 8:
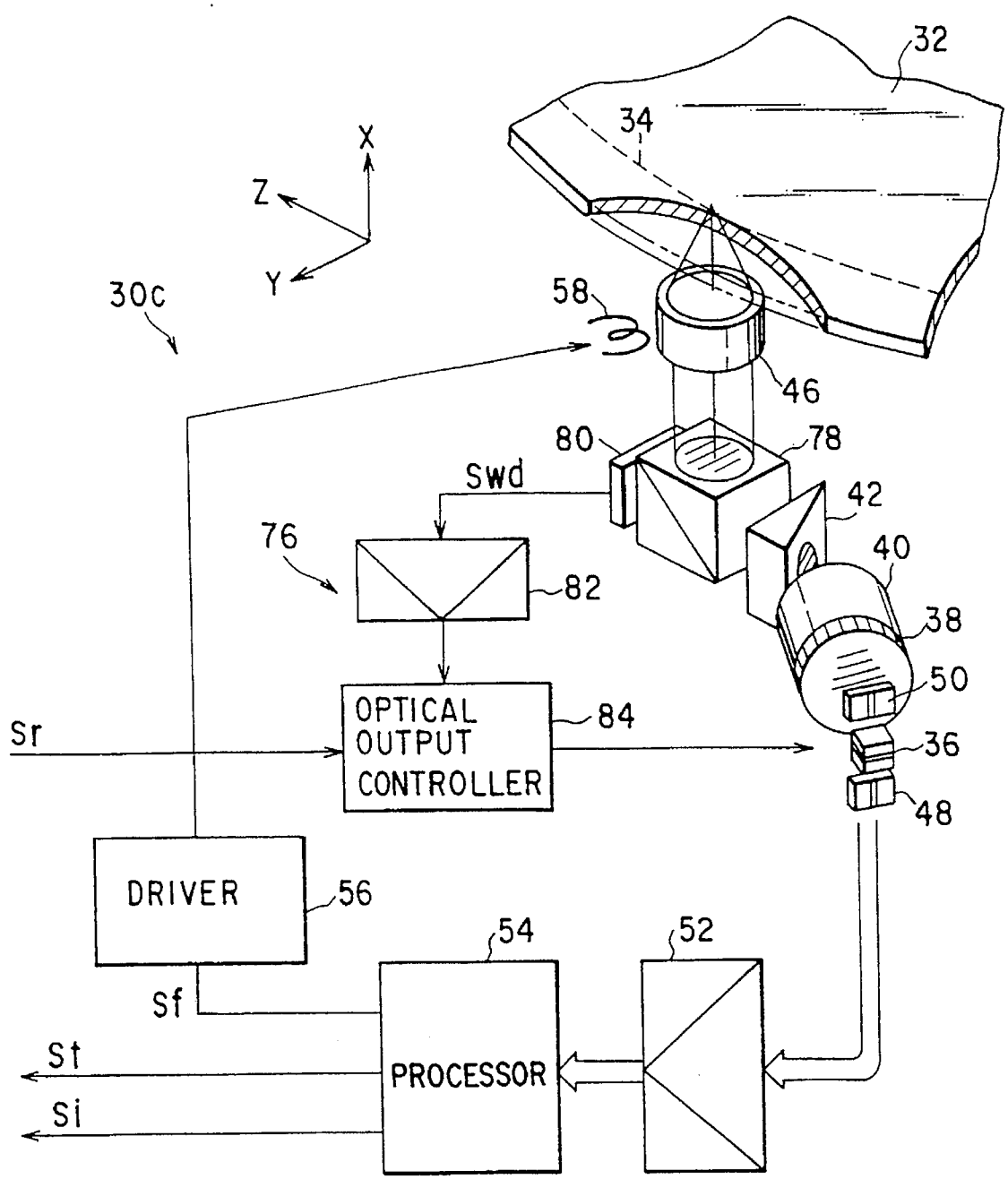

An optical head device 30c shown in FIG. 8 is similar to that of FIG. 1 with (1) a laser output control loop 76 being additionally provided to be coupled to the output of the beam-shaping prism 42 and to the light-source laser 36. More specifically, the mirror 44 of FIG. 1 is replaced with a beam splitter 78, which is associated with a photodetector 80. Beam splitter 78 divides the output light of beam-shaping prism 42 into two light beams, one of which (i.e., light reflected by this beam splitter) is guided to enter the objective lens 46, and the other of which (i.e., light transited through the beam splitter) is to be introduced onto photodetector 80. The added control loop 76 includes an amplifier circuit 82 coupled to an output detection signal Swd of photodetector 80, and an optical output controller 84 connected to amplifier 82. Controller 84 has an input for receiving an electrical recording information signal Sr and an output connected to laser 36.

The optical output controller 84 is an electric circuit for properly adjusting the optical output of the light-source laser 36 in accordance with a operation state (i.e., a recording mode or a play-back mode) of the optical head device 30c. During a play-back operation, the controller 84 performs a laser emission variation compensating operation to maintain the actual optical output of laser 36, which tends to vary in accordance with variations in laser operation conditions such as ambient temperature, at a predetermined standard level. During a recording operation, controller 84 compensates for undesired variations in light amount in response to the detection signal Swd output from photodetector 80 and indicative of a laser write beam actually projected on the optical disk 32, thus adjusting the actual light emission amount of laser 36.

With such an arrangement, even if a light beam reflected by the optical disk 32 returns to the light-source laser 36 to unwantedly disturb output laser light, such disturbance can be suppressed or prohibited, thus accurately controlling the output laser light.

Figure 9:
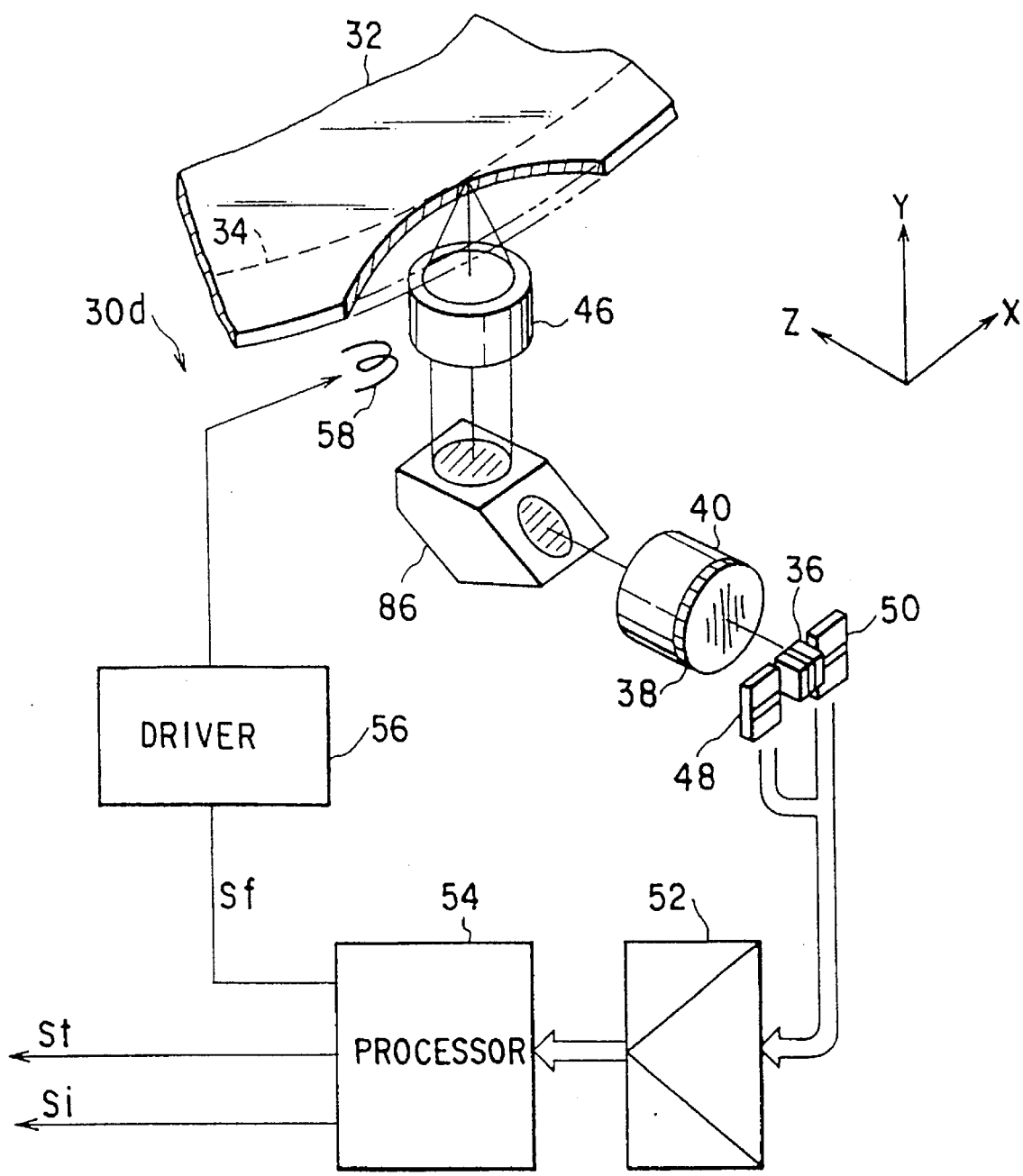

An optical head device 30d shown in FIG. 9 is similar to that of FIG. 1 with (1) the HOE 38 and photodetectors 48, 50 being rotated by 90 degrees with respect to the main optical axis, and (2) the mirror 44 of FIG. 1 is replaced by a beam-shaping splitter 86, which has both the beam-shaping function and the beam reflecting function.

Figure 10:
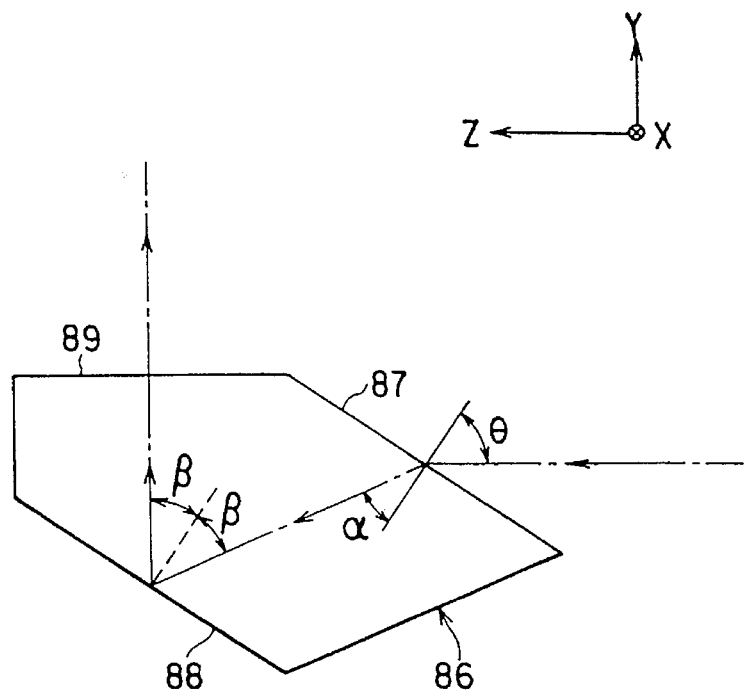
FIGS. 10 and 11 show two possible detailed prism structures that may preferably be used as a beam-shaping prism unit as shown in FIG. 9.

The beam-shaping splitter 86 of FIG. 9 has three main optical surfaces 87 to 89, as shown in FIG. 10. The first surface 87 has a beam-shaping function and is specifically designed such that the incident angle becomes equal to the Brewster angle. The beam-shaping magnification of first surface 87 is equal to the refractive index of a glass material. The second surface 88 opposing the incident surface 87 is a reflecting surface, which is parallel to surface 87. The third surface 89 is an exit surface obliquely opposing the surface 88. A light beam reflected from surface 88 is vertically incident on surface 89 and is sent forth internally.

With such an arrangement, by only performing a simple process with respect to an original flat glass plate having two opposite parallel surfaces such that the third surface 89 is properly angled, a beam-shaping splitter structure 86 having a desired optical characteristic precision can be manufactured. This leads to a reduction in the manufacturing cost of the optical head device 30d. In addition, since the beam-shaping splitter 86 has both the beam-shaping function and the beam-reflecting function, the number of optical element components required for an optical head device can be further decreased. Therefore, a further decrease in the size of an optical head device can be achieved.

Figure 11:
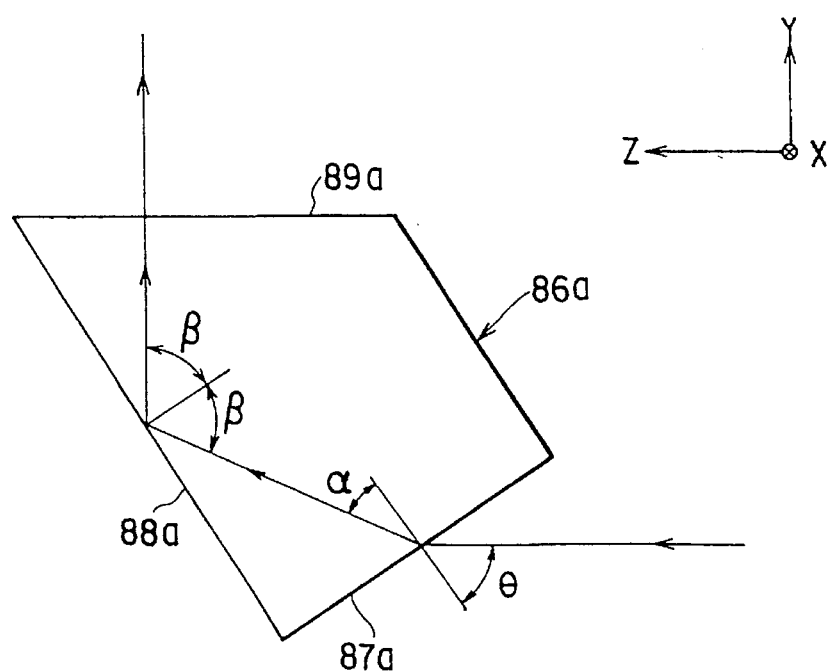

The prism structure 86 of FIG. 10 may be modified as shown in FIG. 11, wherein a beam-shaping prism 86a has a first surface (beam incident surface) 87a defined across the thickness of a prism original plate member having two opposite parallel main surfaces, a second surface (reflecting surface) 88a perpendicular to surface 87a, and a third surface (exit surface) 89a cut obliquely with respect to the main surfaces. Light reflected by reflecting surface 88a vertically enters the exit surface 89a, in a manner similar to the prism structure 86 as described previously.

A further optical head device 30e shown in FIG. 12 is similar in principle to the combination of the embodiments 30c, 30d of FIGS. 8 and 9. More specifically, the prism structure 86 of FIG. 9 is employed and arranged between the collimator lens 40 and the objective lens 46, with the laser output control loop 76 of FIG. 8 being coupled to prism 86. With such an arrangement, a decrease in the size of an optical head device can be achieved, following the advantages of the embodiments of FIGS. 8 and 9.

Figure 13:
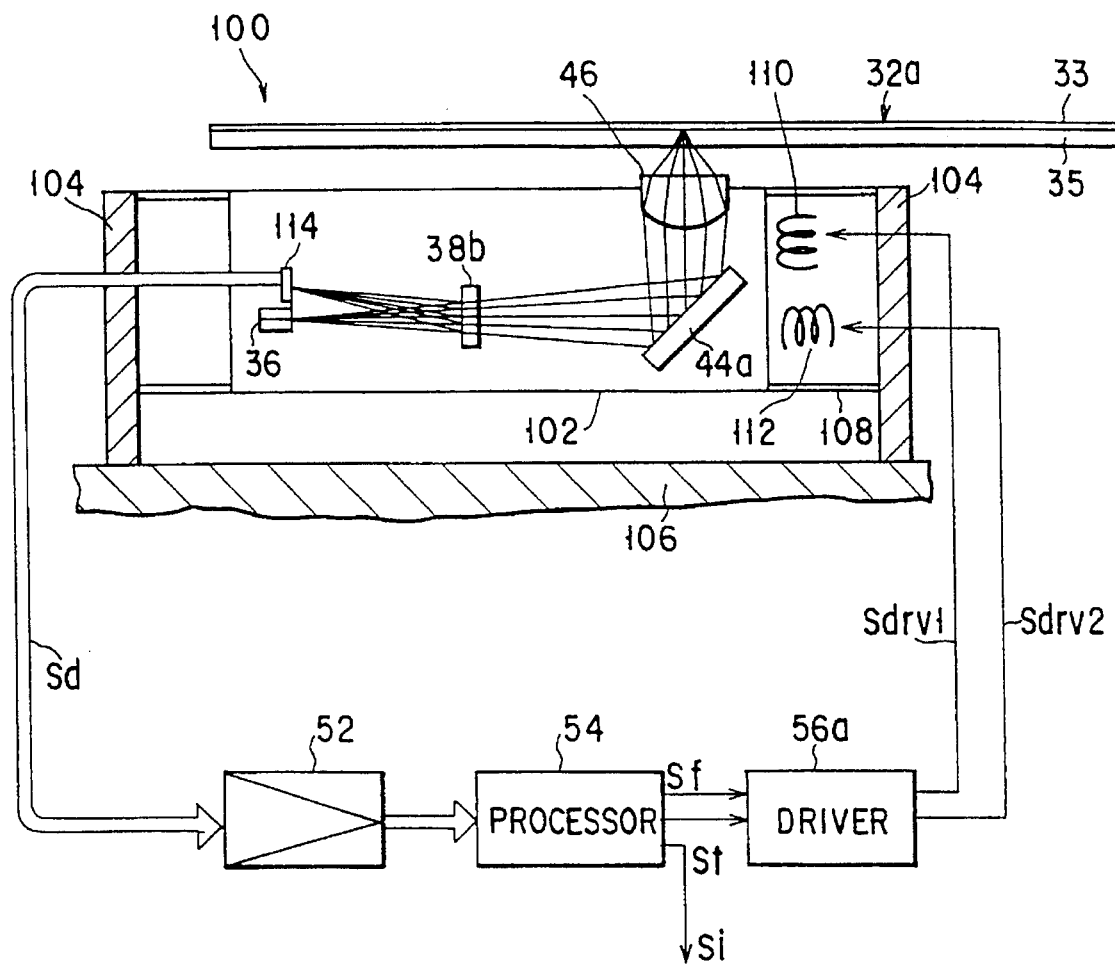
FIG. 13 shows an optical head device also embodying the invention.

An optical head device 100 also embodying the invention is shown in FIG. 13, wherein an optical unit 102 is fixed above a base plate 106 with support members 104. Optical unit 102 is supported by a suspension unit 108, which is movable in the optical-axis direction and in the radial direction of an optical disk 32a. Suspension unit 108 includes two lens-actuator coils 110, 112, which control the movement of optical unit 102, together with the electromagnetic action of a well-known magnetic circuit (not shown).

The optical unit 102 includes the light-source laser 36 of FIG. 1. An output light beam of laser 36 propagates toward a mirror 44a through a holographic optical element (HOE) 38b. The laser beam is reflected by the mirror 44a and is focused by an objective lens 46a to be projected so as to form a small spot on a recording surface 33 of the rotating optical disk 32a, which recording surface is formed on a transparent substrate 35. The light reflected by optical disk 32a propagates in the same optical path in the opposite direction. That is, the reflected light enters HOE 38b through the objective lens 46a and mirror 44a. HOE 38b causes the incident light beam to be incident on a photodetector device 114 arranged near the laser 36. A detection signal Sd from the photodetector 114 is supplied to a processing circuit 54 including an arithmetic unit through an amplifier 52. Processor 54 performs signal processing operations to generate the above-mentioned focus-error signal Sf, tracking error signal St, and play-back information signal Si. Focus-error signal Sf and tracking error signal St are fed to an actuator driver circuit 56a connected to processor 54. Driver 56a is connected to the coils 110, 112 and supplied them with drive signals Sdr1, Sdr2, respectively.

Figure 14:
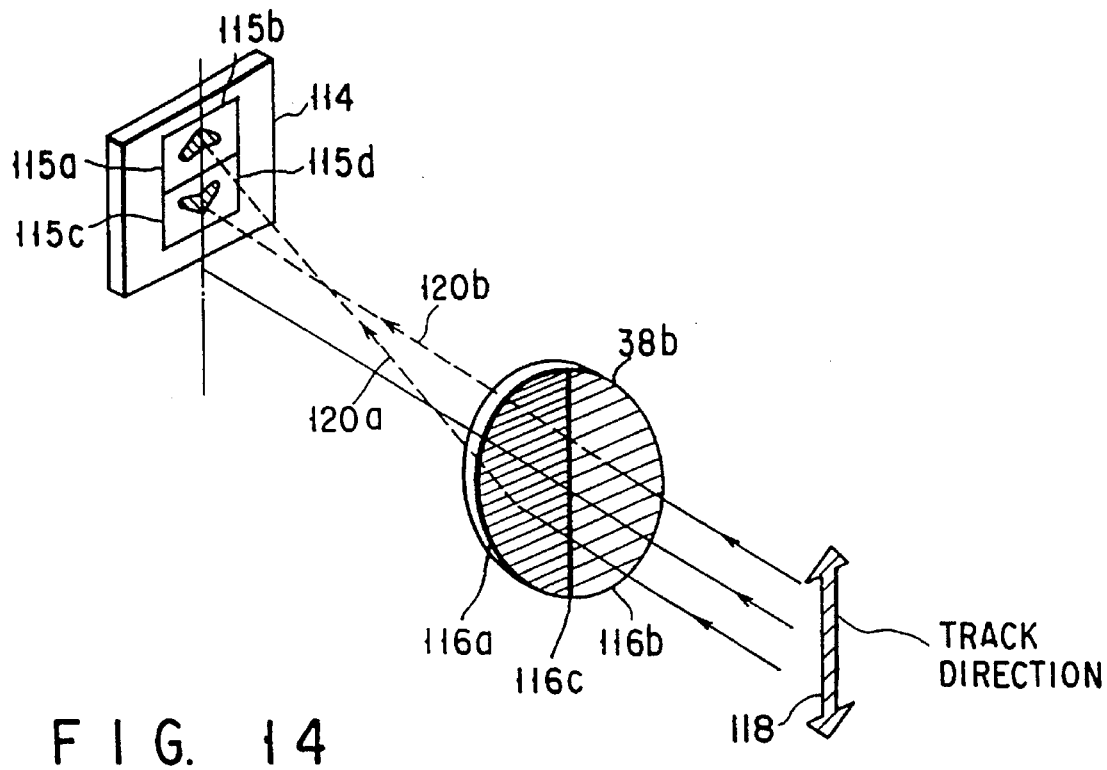
FIG. 14 illustrates the main part of an optical system of FIG. 13.

As shown in FIG. 14, the HOE 38b spatially opposes the photodetector 114. Photodetector 114 has a matrix of first to fourth photosensitive areas 115a–115d obtained by vertically and laterally dividing a surface of photodetector 114 into four areas. HOE 38b has two subdivided holographic areas 116a, 116b divided by an area division line 116c. This line 116c is parallel to the track direction indicated by an arrow 118. Holographic areas 16a, 116b have holographic patterns, each constituted by a large number of grating elements extending in a direction perpendicular to track direction 118. A "pincushion distortion"-like hologram is formed in one of the areas, whereas a "barrel distortion"-like hologram is formed in the other area. Areas 116a, 116b differ in their grating pitches. The formation of these holograms causes a change in beam profile required for detection of a focus error. More specifically, when light beams reflected by the disk 32a propagate in the same optical path as the forward optical path of the optical unit 102 in the opposite direction to be incident on HOE 38b, the light beams are diffracted by the different holographic areas 116a, 116b. As a result, the light beams are sent forth at different exit angles in different directions (indicated by broken arrows 120a, 120b). Photodetector 114 is in these directions 120a, 120b in such a manner that the upper two photosensitive areas 115a, 115b of photodetector 114 receive exit light from the first holographic area 116a, and the lower two photosensitive areas 115c, 115d receive exit light from the second holographic area 116b. Detection signals from the four photosensitive areas 115a–115d are amplified by the amplifier 52 of FIG. 13 and are supplied to the processor 54.

Figure 15A:
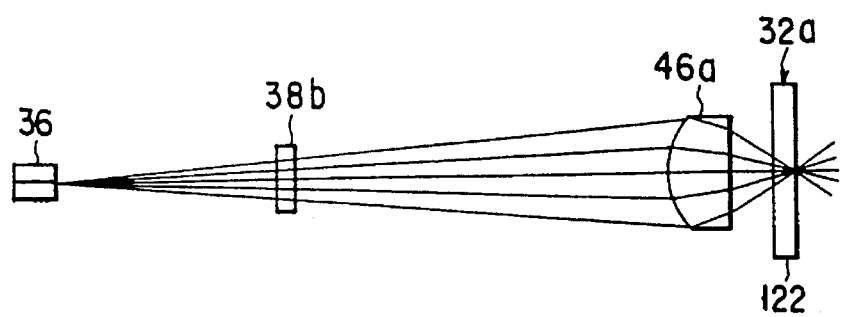
FIGS. 15A and 15B show an equivalent optical system of the FIG. 13 embodiment and that of a corresponding standard optical system.
Figure 15B:
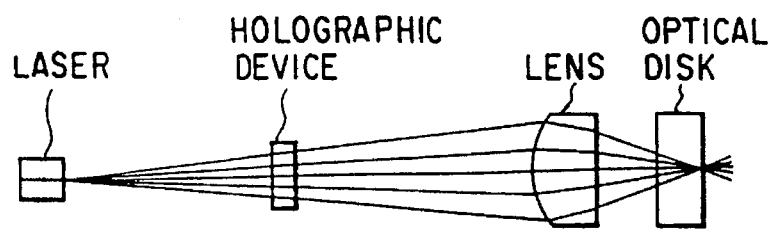

The optical characteristics of the objective lens 46a will be described below with reference to FIGS. 15A and 15B, wherein FIG. 15A shows a main optical system of the optical head device 100 in FIG. 13, and FIG. 15B shows an optical system corresponding to a comparative example of a standard structure. Both the objective lens 46a and the standard objective lens are optical lenses of a finite conjugate. The mirror 44a is omitted from FIGS. 15A and 15B for purposes of explanation only.

Referring to FIG. 15B, the objective lens generally has an imaging magnification of ¼. The lens aperture corresponds to about 1.25 times that of an optical lens of an infinite conjugate. For example, in a digital audio disk (DAD) system known as a compact disk (CD) player, since the numerical aperture is 0.45, the apparent numerical aperture is 0.56. In an objective lens of the infinite conjugate, a numerical aperture of about 0.55 is considered suitable practically. Therefore, when the numerical aperture is small, an objective lens of the finite conjugate, which has a relatively larger imaging magnification, can be manufactured. However, in order to reproduce information from optical disks having a high information recording density, it is required to focus a laser beam so as to project a small beam spot on an optical disk. To do this, it is effective to reduce the wavelength of the light-source laser or increase the numerical aperture of the objective lens. If, for example, an objective lens having a numerical aperture of 0.55 is constituted by a finite conjugate lens, the apparent numerical aperture becomes as large as 0.69 at a normal imaging magnification. Such an arrangement is very difficult to realize in practice.

In contrast to this, according to the embodiment shown in FIG. 15A, the imaging magnification is made small to prevent an increase in apparent numerical aperture, and the numerical aperture is suppressed to a level which allows the manufacture of a lens by using the state-of-the-art techniques, thereby realizing a finite conjugate lens by using an objective lens having a proper numerical aperture. Assume that the imaging magnification is ⅐. In this case, even if an objective lens 46a having a numerical aperture of 0.55 is used, the apparent numerical aperture can be suppressed to 0.63, which is larger than a normal numerical aperture by about 10%.

In addition, if the focal length of the objective lens 46a is decreased, the aperture of the lens is reduced compared with an objective lens having the same numerical aperture. This makes it easier to manufacture the lens. However, in an optical disk apparatus, the working distance of the objective lens 46a must be set at a predetermined value in order to prevent contact of the optical disk 32a with objective lens 46a even if an error is caused in position control in the optical axis direction of lens 46a with respect to surface deflection of optical disk 32a. This means that the focal length of the objective lens cannot be decreased infinitely. In addition, an information recording layer is formed on the lower surface of a transparent substrate (122 of FIG. 15A) of the disk to prevent written information from being destroyed upon adhesion of dust to the surface of the disk or formation of scratches thereon. As the substrate increases in thickness (to ensure a predetermined working distance or more), the objective lens is required to have a longer focal length.

By taking account of this, the optical disk 32a of FIG. 13 is especially arranged to be less in thickness than presently available optical disks. As is known to the experts in this technical field, optical disks generally have a thickness of 1.2 mm. If the required working distance is 1 mm, the focal length of an objective lens is 3 mm. If the substrate (122 of FIG. 15A) of the optical disk has a thickness of 0.6 mm, the focal length can be permitted to decrease to about 2.3 mm, even though the same working distance is ensured. In addition, the operation distance of an infinite conjugate objective lens inherently tends to increase, even if it has the same focal length as that of a finite conjugate objective lens. That is, if a certain required working distance need only be ensured, the focal length can be further decreased. As described above, if the imaging magnification is set at ⅐, the focal length can be decreased to about 2 mm. As compared with the comparative case shown in FIG. 15B, the focal length is allowed to decrease to ⅔. Therefore, the physical length of the optical unit 102 can be reduced to ⅔. This greatly contributed to a decrease in the size of an optical head device.

In general, an objective lens having a large numerical aperture exhibits a large amount of wavefront aberrations with respect to a shift from the installation position of an object point (i.e., a light source). As the imaging magnification is reduced, the allowable range of position shifts in the optical axis direction is expanded. If the object point position is slightly shifted from the optimal object point position of a finite objective lens in the optical axis direction, the allowable range of positional shifts of the object point within a plane perpendicular to the optical axis can be expanded. This will be seen by the graphs of FIGS. 16 and 17. FIG. 16 is a graphic representation of the distribution of wavefront aberrations $\lambda$ RMS in the optical axis (Z-axis) direction. FIG. 17 is a graphic illustration of the distribution of wavefront aberrations $\lambda$ RMS in a direction parallel to one of orthogonal axes (X or Y axes) on a plane perpendicular to the optical axis.

As is apparent from FIGS. 16 and 17, in the case where the object point (light-source) position is the optimal position (Z=0), while the wavefront aberration RMS remains smaller if the optical-axis direction is represented by X=Y=0, the wavefront aberration is large along any one of the X- and Y-axis directions. However, when the object point is shifted in position far from the objective lens 46a along the Z-axis, the wavefront aberration will become smaller in each of the X- and Y-axis directions than in the case of Z=0.

According to the optical head device 100, by reducing the imaging magnification and using a finite system objective lens having a focal length required to ensure the minimum working distance, an optical system having a large numerical aperture can be attained. At the same time, the optical system can be simplified, and hence a decrease in the size of the optical head device can be realized. In addition, by decreasing the thickness of an optical disk associated with the optical head device, the focal length of the finite conjugate objective lens 46a can be further reduced. This will further promote a decrease in the size of the optical head device. Furthermore, an improvement in reliability can be realized. In the optical unit 102 including the finite system objective lens 46a, by disposing the light-source laser 36 at a position slightly shifted backward from the optimal object point position, the allowable installation precision value of the object point (light-source point) on a plane perpendicular to the optical axis (Z axis) can be increased. This facilitates the assembly process of components in the manufacture of an optical head device.

Figure 18:
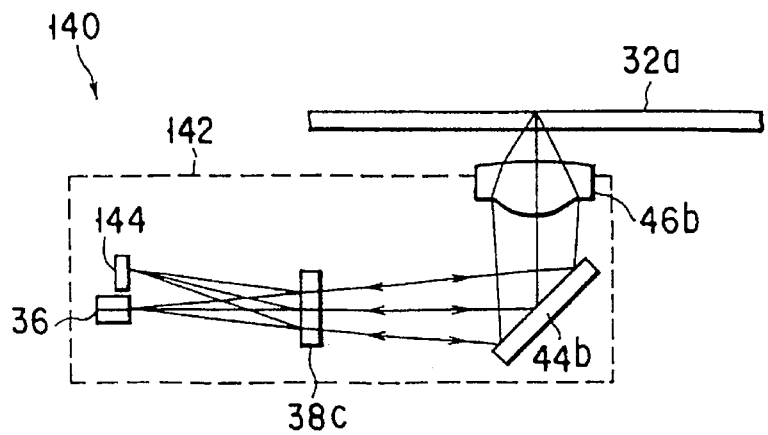
FIG. 18 shows an optical head device also embodying the invention.

An optical head device 140 shown in FIG. 18 includes an optical unit 142, which includes the light-source laser 36 of FIG. 1. An output beam of laser 36 propagates toward a mirror 44b through a holographic optical element (HOE) 38c. The light reflected by mirror 44b is focused by an objective lens 46b and is projected onto the recording surface of an optical disk 32a to form a small spot thereon. The reflected beam (i.e., the reflected beam indicative of read information) from the optical disk 32a propagates in the same optical path in the opposite direction to enter HOE 38c through the objective lens 46b and mirror 44b.

The HOE 38c is a "composite-function diffraction type optical element" having a beam branching function, a beam splitting function, and/or other special lens functions. The above term of HOE 38c is used to discriminate it from a diffraction type optical element constituted by a known simple diffraction grating having grating elements arranged at an equal pitch. An incident beam (disk reflected beam) onto HOE 38c is optically branched by this element to propagate toward a photodetector 144, as in the embodiment shown in FIG. 13. An electric control system associated with photodetector 144 is the same as that in the embodiment shown in FIG. 13.

Figure 19:
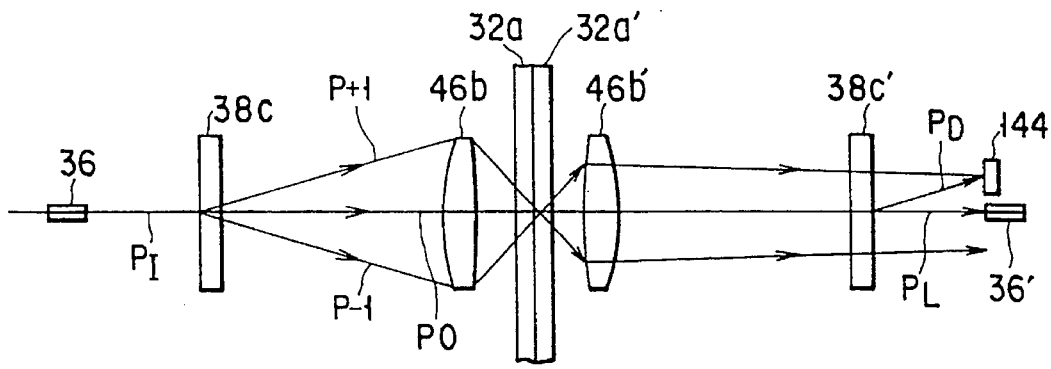
FIG. 19 illustrates the main part of an optical system of FIG. 18.

A main optical system of the optical unit 142 can be developed with the optical disk 32a being the center of the system, as shown in FIG. 19. FIG. 19 illustrates forward and reverse optical paths, which are actually the same optical path, separately (symmetrically) to be easily understood visually, for purposes of explanation.

In the equivalent optical system shown in FIG. 19, a light beam PI emitted from the laser 36 is incident to HOE 38c. A light beam P0, which will be a reproduction signal detecting beam, is sent forth from this element 38c as a transmitted light therethrough. The output light of HOE 38c may also include undesirable light beams P+1, P–1 which propagate at a predetermined diffraction angle. These light beams are stray light. Light beams P+1, P0 and P–1 are focused by the objective lens 46b to be projected onto the optical disk 32a. The light reflected by optical disk 32a enters the objective lens (indicated by 46') again and propagates toward a holographic optical element (HOE) 38c'. A light beam PD of the light beam P0, which is diffracted by HOE 38c, propagates toward the photodetector 144 as the reproduction signal detection beam. There is also an optical beam component PL simply transmitted through HOE 38c', which light component is so-called return light which propagates along the optical axis and returns to a laser 36'.

The relationship between the reproduction signal detection beam PD and the return light PL will be described next with reference to the graph of FIG. 20, which shows the distribution (light amount distribution) of the diffraction efficiency of each of 0th-order, 1st-order, and 3rd-order diffractions with respect to the optical phase difference of a holographic optical element comprising a binary phase grating. When the phase difference is $\pi$, the transmitted light amount becomes substantially zero, as indicated by the 0th-order curve. The 1st-order diffracted light is diffracted in the positive and negative directions by 40% (diffraction efficiency is 0.4) at maximum. When the transmittance of the 0th-order light is 50%, that of the 1st-order light is 20%. When the transmittance of the 0th-order light is 28%, that of the 1st-order light is 30%.

FIG. 21 shows the distribution (a change in light amount) or diffraction efficiency of each of output light beams from HOE 38c, i.e., the play-back signal detection PD and the return light PL with respect to the optical phase difference. In order to compare and analyze the influence of the diffraction efficiency of HOE 38c, this characteristic diagram assumes that in the optical system in FIG. 19, no optical loss is caused in optical elements other than this HOE. The same goes with the characteristic diagram of FIG. 22.

Figure 20:
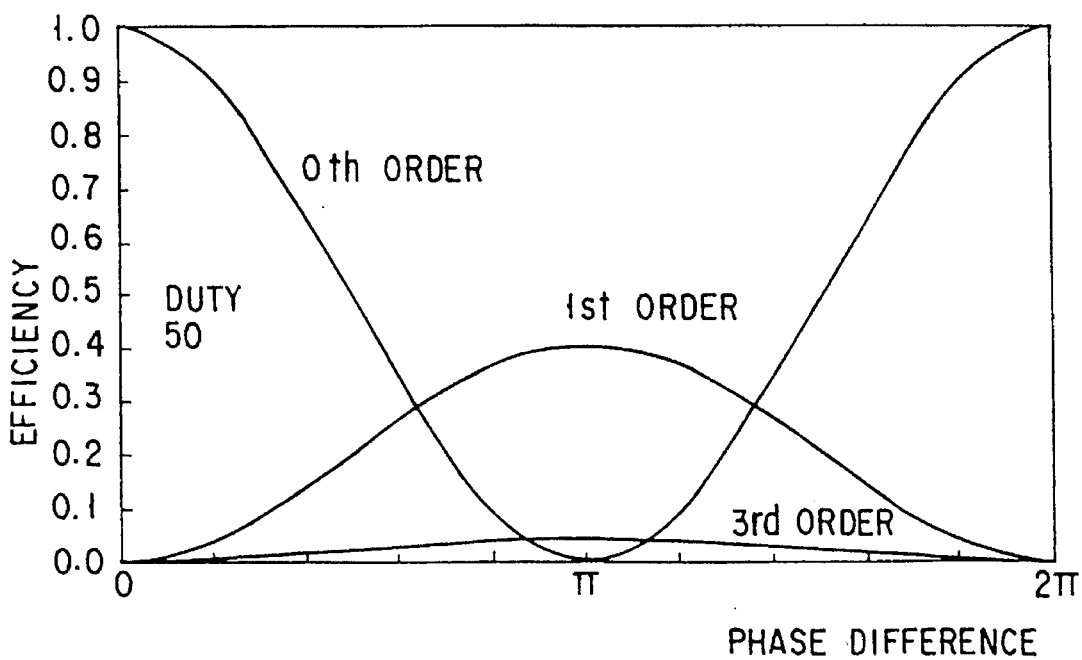

The characteristic diagram of FIG. 21 shows a case wherein the HOE 38c has the optical characteristics shown in FIG. 20. The amount of the play-back signal detection beam PD is maximized when the optical phase difference is $\pi/2$. When the transmittance increases or decreases, the light amount decreases. The amount of the return light PL decreases as the phase difference approaches the value $\pi$. In the prior art, under the conditions which maximize the amount of the play-back signal detection beam PD, the amount of light which actually reaches the photodetector is 10%, and the amount of return light to the light-source is 25%. In contrast to this, the transmittance and diffraction efficiency of HOE 38c of the embodiment 140 are specifically selected to satisfy the following inequality:

$$PL \leq PD. \tag{4}$$

Typically, when the transmittance is 28%, the diffraction efficiency is about 30%. With this setting, the amount of return light to the light-source laser 36 was 7.8%, and the amount of the play-back signal detection beam PD which actually reached the photodetector 144 was 8.4%. When the amounts of light distributed to the optical elements 36, 144 of the embodiment 140 are compared with those in the prior art, it is found that the amount of undesirable return light PL to the light-source 36 in the present invention is reduced to almost ⅓, and at the same time, a decrease in the amount of light actually received by the photodetector 144 can be suppressed to about 20%. As described above, by increasing the diffraction efficiency of HOE 38c while decreasing its transmittance, the amount of return light PL can be greatly reduced. This leads to the achievement of a high signal-to-noise ratio.

The characteristic diagram of FIG. 22 shows a case wherein a diffraction type optical element having a sawtooth cross-sectional grating pattern and designed to cause diffraction light to concentrate on positive orders of diffraction is used as HOE 38c. In this case, the transmittance and diffraction efficiency of the HOE are selected to satisfy relation (4) described above. For example, when the transmittance is 42%, the diffraction efficiency is 46%. In this case, the amount of the return light PL to the light-source 36 was 18%, and the amount of the play-back signal detection beam PD which reached the photodetector 144 was 20%.

In the optical system of FIG. 19, as the HOE 38c inserted between the laser 36 and the objective lens 46b is separated from laser 36, the ratio of the stray light beams P+1, P−1 incident on the photodetector 144 increases. Especially undesirable light components such as the stray beams P+1, P−1 which are diffracted by HOE 38c in the forward optical path, reflected by the optical disk 32a, pass through the same holographic optical element (38c'), and reach photodetector 144, cause a deterioration in operation reliability.

Figure 23A:
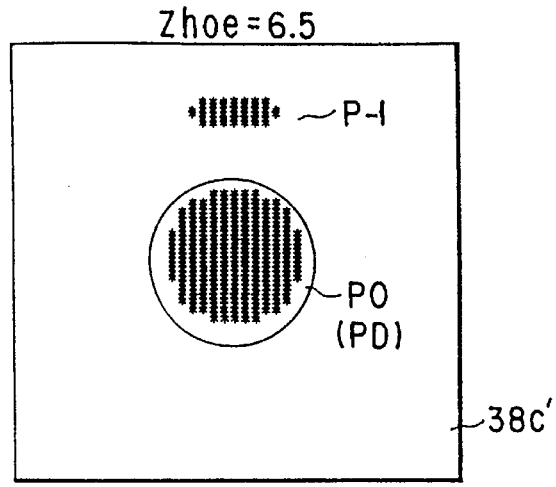
FIGS. 23A to 23C show some patterns of effective diffracted light beam and of stray light on the holographic device of FIG. 19 under different conditions regarding the positioning of it.
Figure 23B:
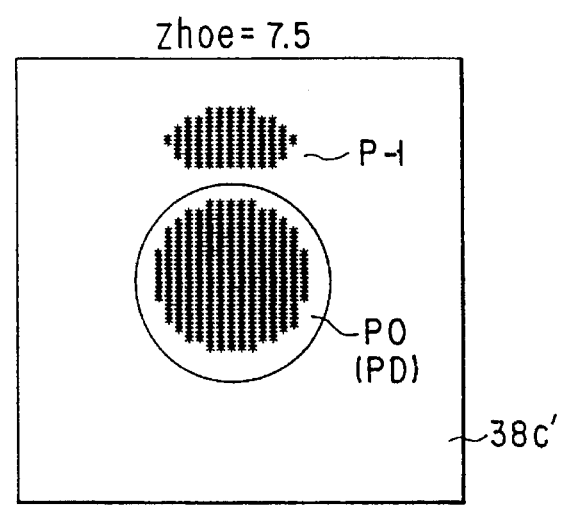
Figure 23C:
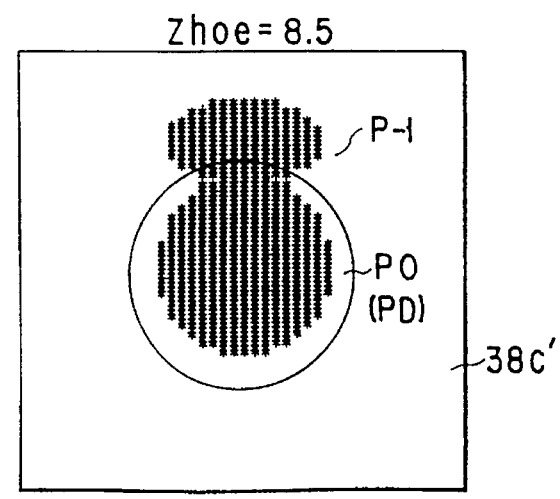

The effective diffracted light P0 and the stray light P−1 emerging from the HOE 38c form the following optical patterns on the surface of the HOE 38c'. FIGS. 23A to 23C show spot diagrams that may be observed when the insertion position of HOE 38c in the optical path is changed to three positions (i.e., Zhoe=6.5, 7.5 and 8.5). Consider stray light P−1. If HOE 38c is located near the light-source laser 36, the resulting diffraction angle is large, and the amount of light incident on the aperture of the objective lens 46b is small. Consequently, the amount of light which is reflected by the optical disk 32a and incident on HOE 38c is also small. Refer to FIG. 23A in this connection. Note that under this condition, it is difficult to manufacture HOE 38c with high precision. This is because the grating pitch of HOE 38c becomes small.

As the insertion position of the light-source laser 36 is separated from the HOE 38c, the collimating of spot diagram of the stray light component P−1 increases. In the case of FIG. 23C, stray light P−1 increases in area so as to overlap the effective diffracted light P0. When HOE 38c is located far away from laser 36, the resultant diffraction angle is reduced. Therefore, the amount of light which is reflected by the optical disk 32a and returns to HOE 38c increases as a whole. As the insertion position of HOE 38c is separated from light-source laser 36, the amount of stray light component overlapping the play-back signal detection beam PD increases. Overlapping between an effective light and stray light makes it more difficult to extract the stray light, resulting in difficulty in achieving an enhanced signal-to-noise ratio and an improved reliability.

In order to solve the above-described problems, in this embodiment, the position at which the HOE 38c is inserted, in the optical path, between the light-source laser 36 and the objective lens 46 is specifically determined as follows. Provided that a transmission aperture allowing incidence of a light beam having a diameter required for the aperture of objective lens 46 is provided to HOE 38c, the insertion position of HOE 38c is determined (1) at a position which falls inside a position range which satisfies a condition that the stray light components P+1, P−1 are blocked to prohibit their incidence on the photodetector 144 when the stray light components are reflected by the optical disk 32a and pass through a certain position shifted from the center of HOE 38c, and (2) at a specific optical axis position located farthest from laser 36 within this position range. With the embodiment, the adverse effects of undesired stray light components are removed to increase the signal-to-noise ratio of a play-back signal while achieving a decrease in the size of the optical head device 140.

Figure 24:
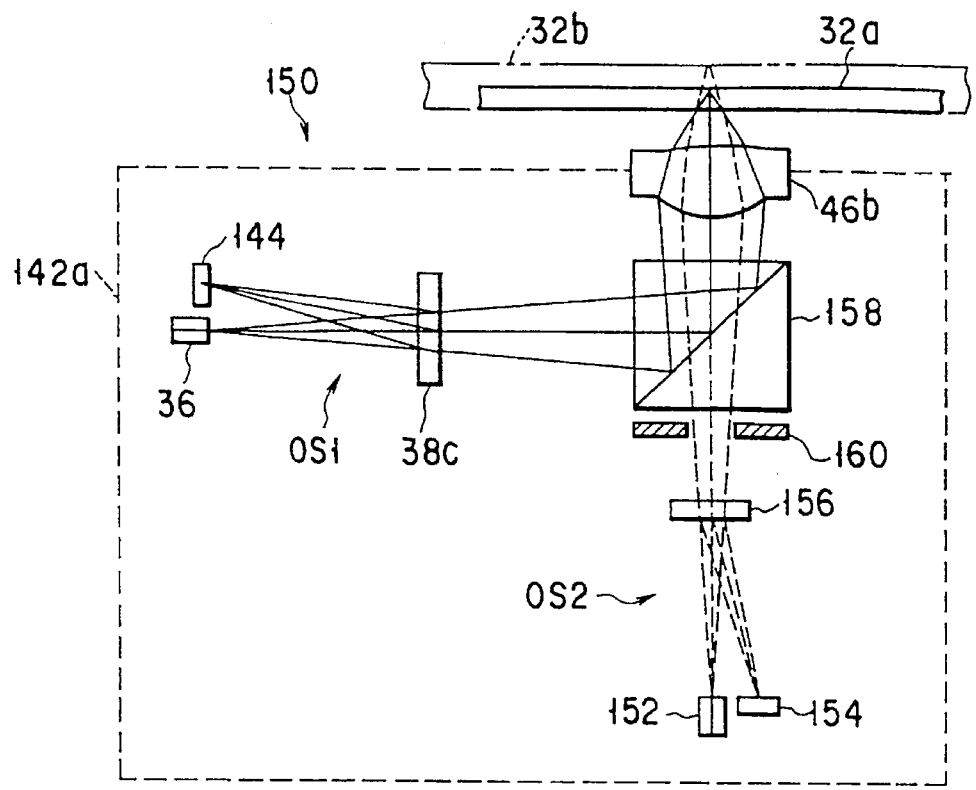
FIG. 24 illustrates an optical head device also embodying the invention, which permits the selective use of a plurality of optical disks being different in substrate thickness from each other.

A further optical head device 150 shown in FIG. 24 is similar to that of FIG. 18 with (1) another set of a light-source laser 152, a photodetector 154 and a holographic optical element (HOE) 156 being added, and (2) the mirror 44b of FIG. 18 being replaced with a beam splitter structure 158 in an optical unit 142a. Optical elements 36, 38c, 144 constitute a first optical system OS1, whereas additional optical elements 152, 154, 156 constitute a second optical system OS2. Beam splitter 158 is optically coupled at its first plane to first system OS1 and to second system OS2 at a second plane thereof. The main optical axes of these optical systems are transverse to each other. Second optical system OS2 is different from first system OS1 in that an aperture-limit plate 160 is inserted between holograpic device 156 and the second plane of beam splitter 158 as shown in FIG. 24. Second system OS2 also differs from first system OS1 in that laser 152 and holographic device 156 is positionally shifted toward beam splitter 18, while laser 152 and photodetector 154 are similar to laser 36 and photodetector 144 in optical characteristics and arrangement; each of first and second systems OS1, OS2 may be arranged as shown in FIG. 14.

The optical unit 142a with a pair of optical systems OS1, S2 can achieve an optimized read (reproduction) operation by cutting off any stray light successfully in case of any one of the optical disks 32a, 32b of different substrate thicknesses being selectively used, while permitting the overall optical system to be reduced in size. This can be said due to the fact that the first optical system OS1 is specifically arranged so that the read operation for thin optical disk 32a becomes optimized, and that the second system OS2 is arranged such that the read operation for the thick optical disk 32b is accomplished as commercially available in the optical-disk art. First and second optical systems OS1, OS2 are controlled to operate selectively in accordance with the thickness of a presently used one of optical disks 32a, 32b. Note that the objective lens 46b is designed so as to have a desired imagery magnification when the thin optical disk 32a is used.

Figure 25:
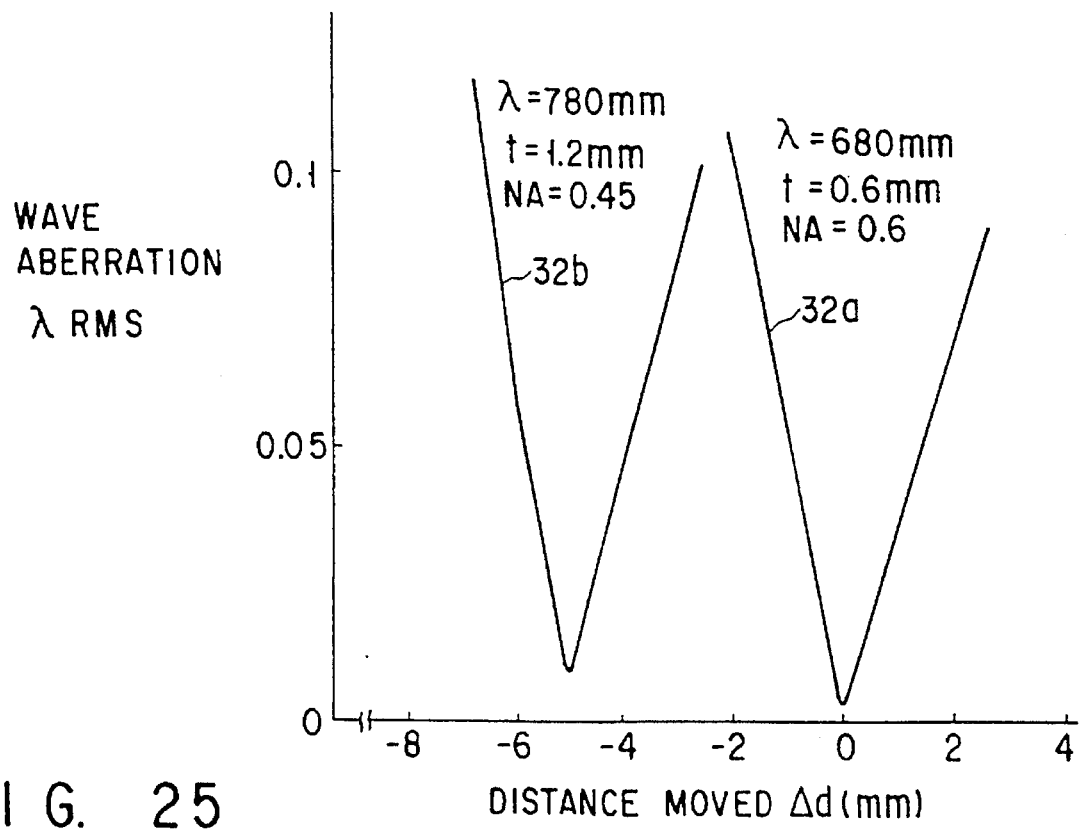
FIG. 25 is a graphic representation of the optical characteristic of the embodiment of FIG. 24.

An explanation will now be given regarding how the optical disks 32a, 32b of different thicknesses can be played back or reproduced by using the single objective lens 46b, with reference to the characteristic diagram of FIG. 25. FIG. 25 is a graph which plots the wavefront aberration as a function of distance (shift amount) Δ d along the optical axis direction with the distance between the light source and the objective lens being used as a reference value, with respect to each of optical disks 32a, 32b of FIG. 24. This graph shows the results of measurement in a case where objective lens 46b uses an optical lens having a focal length of 2 mm. This optical lens is designed under the following conditions: the wavelength of light-source laser is 680 nanometers (nm), the numerical aperture is 0.6, the substrate thickness of optical disk is 0.6 mm, and the imagery magnification is 0.14.

It is apparent from viewing FIG. 25 that, in the case of an objective lens optimally designed for the thin optical disk 32a, the wavefront aberration λ RMS=0.05 takes place when the light-source position is shifted by 1 mm; the intensity at the center of a spot formed on the optical disk is decreased with the result that it is equivalent to approximately 90% of the central intensity at an optimal position. The main cause concerned in this case is the spherical aberration. The aberration of the objective lens 46b occurred with respect to an optical disk having a thickness different from the designed thickness is due to the spherical aberration, also. This may lead to the following conclusion: a single objective lens can be commonly used to effectively play back optical disks different in thickness from each other, by canceling out the wavefront aberration, which will occur in the different-thickness optical disks 32a, 32b, with the spherical aberration which takes place due to variations in the light-source position. As an example, assume that the thick optical disk 32b has a substrate of 1.2 mm thickness (t=1.2 mm). In this case, when the light-source laser is positionally shifted to become closer toward objective lens 46b by approximately 5 mm, the resultant wavefront aberration can be suppressed to the extent that no problems occur practically.

Turning back to FIG. 24, if the numerical aperture NA2 with respect to the light-source laser 152 in the second optical system OS2 is less than the numerical aperture NA1 of the light-source laser 36 in the first optical system OS1, the aperture-limit plate 160 is positioned in front of the second plane of the beam splitter 158, thereby to limit the diameter of a light beam being incident to the objective lens 46b to a decreased present value. The embodiment is arranged under an assumption that the optical head device is applied in an external read-only storage device (such as "CD-ROM") of a small-size computer apparatus called the "personal computer"; accordingly, it is preferable that aperture limiter 160 is so designed as to have a specific aperture-limiting function that limits the numerical number at 0.45.

Figure 26:
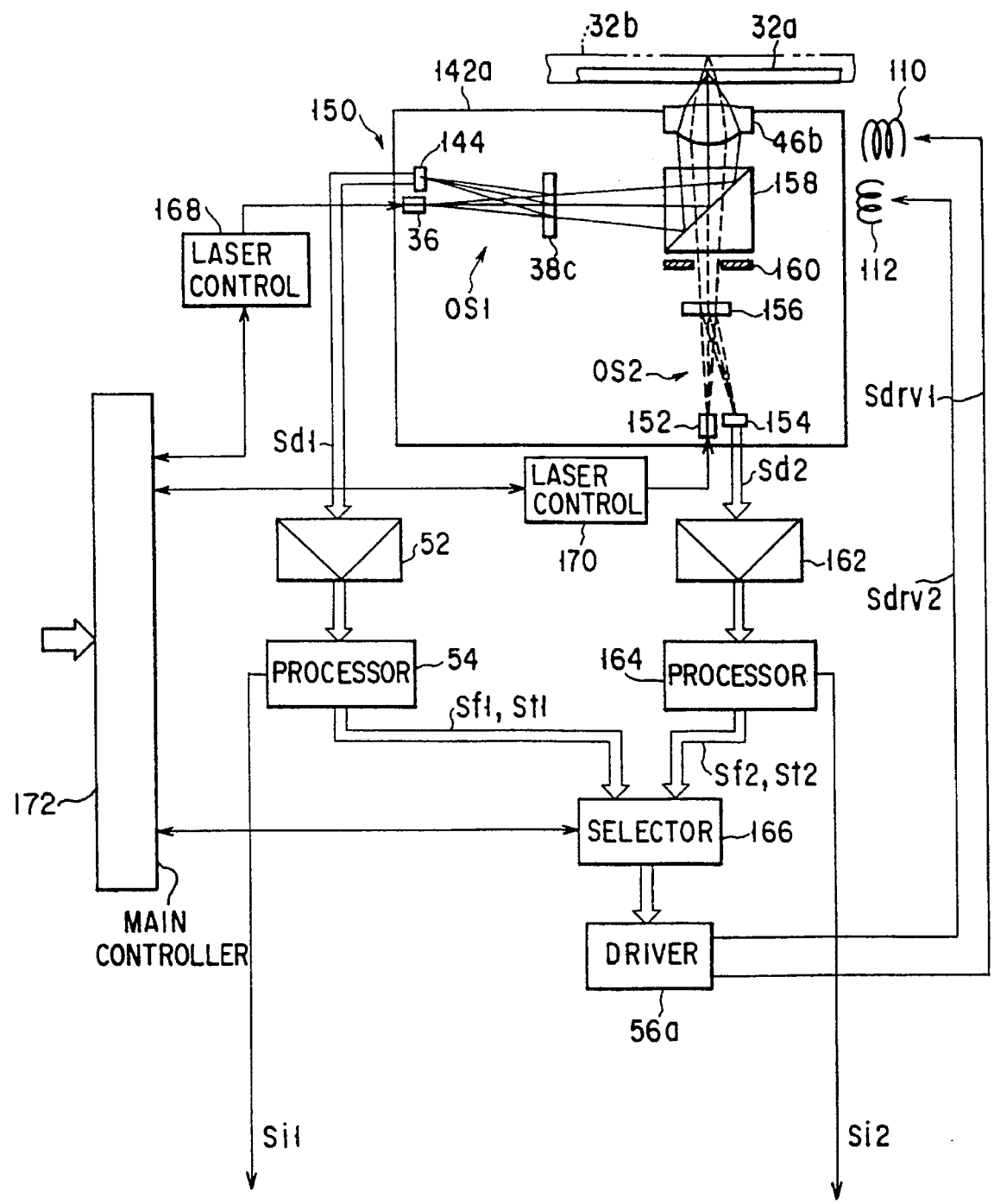
FIG. 26 is a block diagram showing the overall configuration of the embodiment.

An electrical control circuit system associated with the optical head device 150 of FIG. 24 is illustrated in FIG. 26. The configuration of an electrical detection circuit connected to the photodetector 144 in the first optical system OS1 is similar to that of the embodiment of FIG. 13; a redundant explanation thereof will be omitted. The photodetector 154 of second optical system OS2 is connected to an amplifier circuit 162 and an operational processing circuit 164, each of which may be similar in arrangement to a corresponding one of components 52, 54. Processors 54, 164 generate first and second information play-back signals Si1, Si2, respectively.

As shown in FIG. 26, the outputs Sf, St of two operational processing circuits 54, 164 are connected to the first and second inputs of a signal selector circuit 166, which includes a switch circuit. Signal detector 166 has an output connected to actuator coils 110, 112 by way of lens-actuator driver 56a of FIG. 13. The first and second light-source lasers 36, 152 are connected respectively to control circuits 168, 170, each of which electrically feeds a corresponding one of lasers 36, 152. Selector 166 and laser controllers 168, 170 are connected to a main controller 172, which may include a micro-processing unit (MPU) and an interface unit. Main controller 172 instructs laser controllers 168, 170 so that each laser 36, 152 performs a required laser oscillation when it is selected. Main controller 172 also controls selector 166 so that a set of processor outputs Sf, St passes through selector 166 in accordance with the selective operation of first and second optical systems OS1, OS2.

An optical head device 150a shown in FIG. 27 is similar to that of FIG. 24 with the beam splitter 158 being replaced with a beam splitter structure 174 having two parallel incident-light paths. The first and second optical systems OS1, OS2 are arranged so that their optical axes are parallel with each other, causing the total space to decrease. This may lead to a further miniaturization of the optical head device.

An optical head device 150b shown in FIG. 28 is similar to that of FIG. 24 with (1) the lasers 36, 152 being replaced by semiconductor lasers 36a, 152a that are different in wavelength from each other, and (2) the beam splitter 158 being replaced with a beam splitter structure 176 having two reflection planes 178a, 178b thus allowing different-wavelength laser beams of lasers 36a, 152a to be synthesized optically.

More specifically, the first and second optical systems OS1, OS2 are arranged in a plane parallel with the rotating plane of a thin or thick optical disk 32a, 32b. The optical axes of these optical systems OS1, OS2 are transverse to each other. The "synthetic" beam splitter 176 has a cubic structure, which has first and second light-incident planes, which face HOE 38c, 156 at predetermined distances respectively. Beam splitter 176 also has an upper plane that faces the objective lens 46b in a direction substantially perpendicular to the rotation plane of disks 32a, 32b.

The first reflection plane 178a is slanted with respect to the main optical axis of first optical system OS1, causing the output beam of laser 36a to be reflected therefrom toward lens 46b. The second reflection plane 178b is slanted with respect to the main optical axis of second optical system OS2, allowing the output beam of laser 152a to be reflected therefrom toward lens 46b. The reflecting plane 178a is coated with a specific reflection film which exhibits an increased reflectivity for a light beam emitted by the first laser 36a, and which exhibits an increased transmittance with respect to a light beam from the second laser 152a. The optical nature of the reflecting film is reversed as far as the second reflecting plane 178b is concerned; the reflection film 178b employs a different film which exhibits an increased reflectivity for the light beam from the second laser 152a, and which has an increased transmittance with respect to the light beam from first laser 36a. With the embodiment, the optical head device 150b can be decreased in height, causing the optical disk read apparatus to become thinner in shape.

The following will explain an embodiment of the present invention.

Figure 29A:
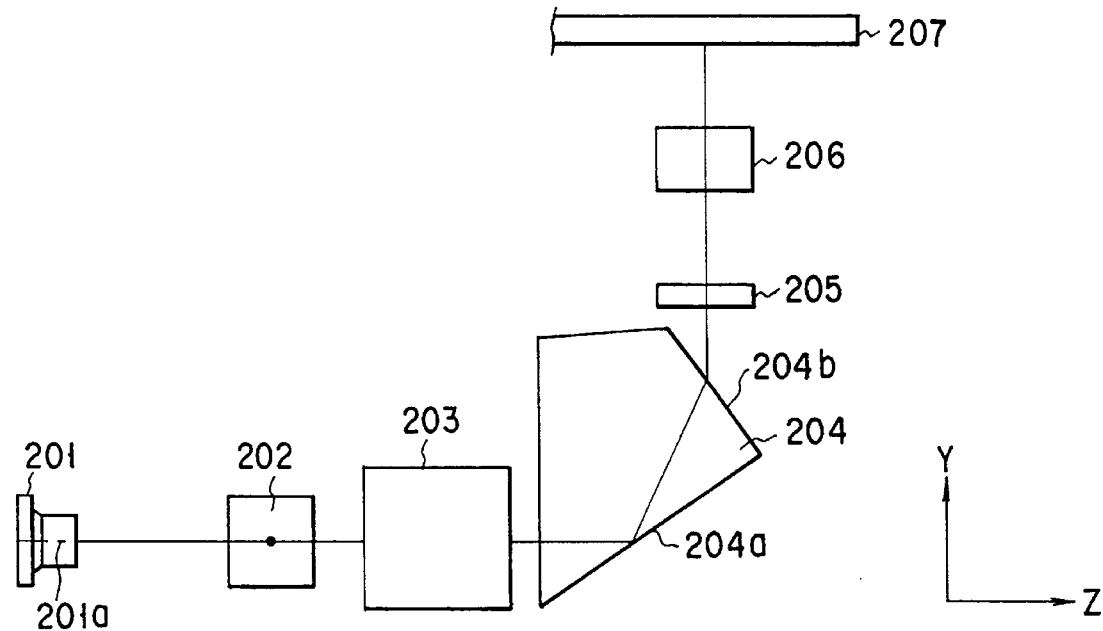
FIG. 29A and 29B show an optical head of one embodiment of the present invention.
Figure 29B:
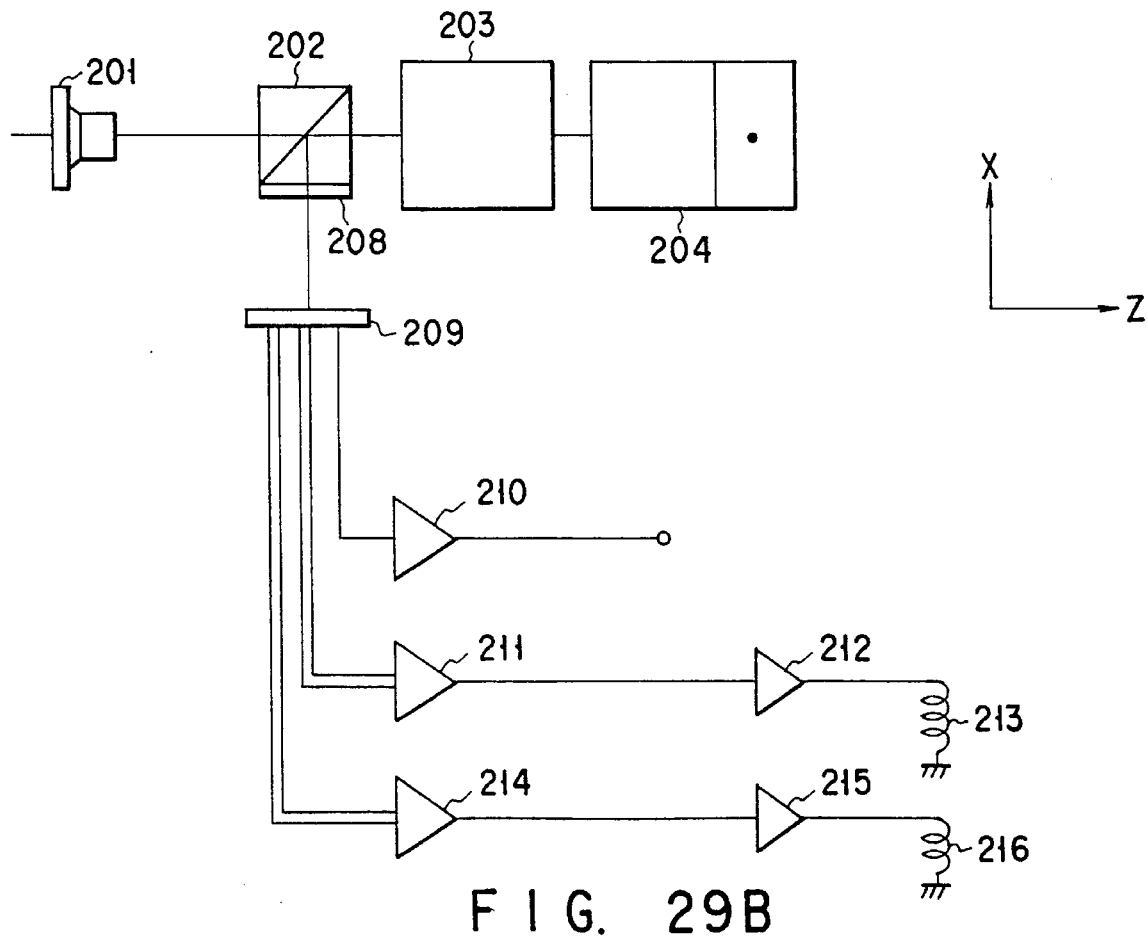

FIGS. 29A and 29B show the structure of the optical head relating to the preferable embodiment of the present invention. The optical head of this embodiment comprises a light source 201, a polarization beam splitter 202, a collimating lens 203, a beam shaping prism 204 with a reflecting surface 204a, a ¼ wavelength plate 205, an objective lens 206, an optical disk 207, a holographic element 208, and a photodetector 209. In order to understand the figures easily, the holographic element 208 and the photodetector 209 are omitted from FIG. 29A, and the ¼ wavelength plate 205, the objective lens 206, and the optical disk 207 are omitted from FIG. 29B. Moreover, in only FIG. 29B, an electrical circuit system is shown to explain the operation.

The electrical circuit system of the optical head device of this embodiment comprises an amplifier 210, a calculation circuit 211, a focus actuator drive circuit 212, and a focus drive coil 213. The electrical circuit system further comprises a calculation circuit 214, a tracking actuator drive circuit 215, and a tracking drive coil 216.

The light source 201 is a linear polarizing laser beam source such as a semiconductor laser. A light beam emitted from the light source 201 (active layer 201a) transmits the polarization beam splitter 202, and a parallel flux of light is formed by the collimating lens 203. Moreover, the direction of the light beam is changed by the beam shaping prism 204 with a reflecting surface 204a, and an anisotropic beam shape is shaped to be substantially isotropic. A light beam sent from an emission surface 204b of the beam shaping prism 204 with a reflecting surface is converted to a circular polarizing light by the ¼ wavelength plate 205. Thereafter, the circular polarizing light is converged by the objective lens 206, so that a fine beam spot is formed on a recording surface of the optical disk 207.

The light beam reflected on the recording surface of the optical disk 207 passes through the objective lens 206 again, so that a linear polarizing light, which is different from a light beam polarizing direction of a forward path at 90°, is formed by the ¼ wavelength plate 205. Then, the linear polarizing light passes through the beam shaping prism 204 with reflecting surface 204a and the collimating lens 203 in a direction, which is opposite to the forward direction.

Since a light beam of a backward path is different from the light beam polarizing direction of the forward path at 90°, all light beams are reflected in a direction of the photodetector by the polarization beam splitter 202.

Diffracted light of the holographic element 208 is detected by the photodetector 209, thereby obtaining a focus error and a tracking error. The calculation circuits 211 and 214 generate focus and tracking error signals. Based on the signals, the focus drive coil 213 is driven by the drive circuit 212 to perform a focus control, and the tracking drive coil 216 is driven by the drive circuit 215 to perform a tracking control. An output of the photodetector 209 is amplified by the amplifier 210 to obtain a signal reproduction.

The specific structure of the focus control system and the tracking control system will be explained as follows.

The focus control system is structured such that a lens actuator, which is used for making the objective lens 204 movable in a direction of an optical axis, or the entire optical head of FIGS. 29A and 29B is mounted on a carriage so as to control the entire optical head to be moved in the direction of the optical axis.

Therefore, in the case of the lens actuator, the focus drive coil 213 means a coil for driving the lens. In the tracking control system, the objective lens 204 is supported by the lens actuator, which is used for making the objective lens 204 movable in a direction of an optical axis. Then, the objective lens is controlled to be movable in the radial direction based on the tracking error signal, thereby tracking control is performed. Or, the tracking control system is structured such that the entire optical head of FIGS. 29A and 29B is mounted on the carriage so as to control the entire optical head to be moved in the direction of the optical axis, thereby tracking control is performed. Therefore, in the case of the lens actuator, the tracking drive coil 216 means a coil for driving the lens.

The feature of the optical head device of this embodiment lies in the following point.

More specifically, light reflected on the recording surface of the optical disk 207 passes through the ¼ wavelength plate 205, and the beam shaping prism 204 with the reflecting surface in a direction, which is opposite to the direction of the forward path, and returns the collimator lens 203. Thereafter, the returned light is divided into the direction of the light source 201 and the direction of the photodetector 209 by the polarization beam splitter 202. In other words, the converging function of the detection system is also formed by the collimating lens 203, thereby reducing the number of elements. Also, since there is used the structure using a complete separation system between the polarization beam splitter 202 and the ¼ wavelength plate 205, the forward path to the optical disk 207 and the backward path can be separated without losing the amount of light, so that efficiency of using light of the light source can be improved.

The beam shaping prism 204 with the reflecting surface 204a has a function of reducing the incident light beam in its only one axial direction in the forward path and expanding the incident light beam in its only one axial direction in the backward path. FIGS. 30A to 30C show the optical characteristics of the beam shaping prism 204 together with the collimating lens 203. In FIGS. 30A to 30C, a beam shaping prism having no reflecting surface is used in order to explain the advantages simply. FIG. 30A shows a cross section of the optical system having a surface, which is parallel to the active layer 201a of the semiconductor laser of the light source 201. An emission light of the semiconductor laser is anisotropic, and a direction (Y direction), which is perpendicular to the active layer whose collimating angle is large, is reduced by the beam shaping prism 301. FIG. 30B shows the optically system, which is equivalent to the optical system of FIG. 30A. It is assumed that the focal distance of the collimating lens 203 is fCL and the beam reducing ration is M (M<1), it becomes equivalent to a state that a lens having a focal distance of (fCL*M) is used.

On the other hand, a cross section of the optical system having a surface, which is horizontal to the active layer 201a of the semiconductor laser of the light source 201, is not influenced by the function of the beam shaping prism 204 as shown in FIG. 30C. Due to this, only the collimating lens 203 is used. In order to explain the influence of the beam shaping prism 204 with reflecting surface 204a, FIGS. 31A to 31D show the shape of the light beam returned from the optical disk 1 at the focal position of the collimating lens 203 in the case that the holographic element 208 is omitted in FIGS. 29A and 29B. In each of FIGS. 31A to 31D, the arachnid shape shows the shape of the light beam, and the square shape means the detector. FIG. 31C shows a case that the optical disk 207 is placed at the focal position of the objective lens 206. At this time, the converging position of the light beam returned from the optical disk is placed at the focal position of the collimating lens 202 in its both vertical and horizontal directions, and the shape of the beam is a point.

Figure 31A:
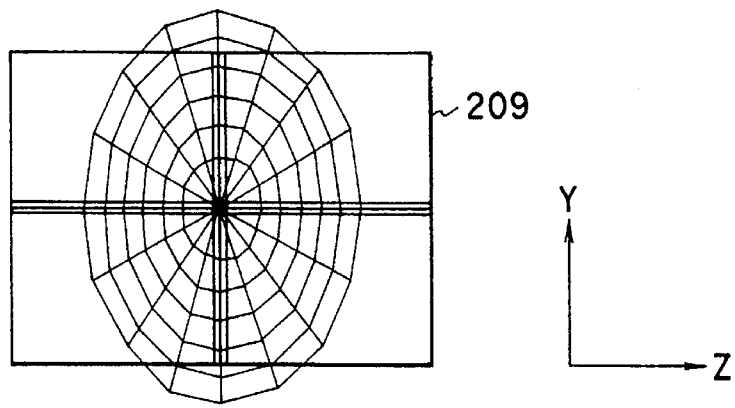
FIGS. 31A to 31E are views showing a light beam on the photodetector in a case that there is a function of the beam shaping prism of the optical system of FIG. 29, respectively.
Figure 31B:
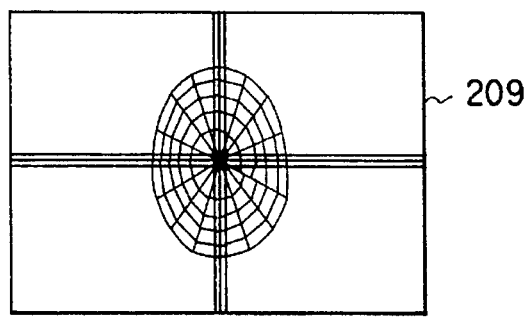
Figure 31C:
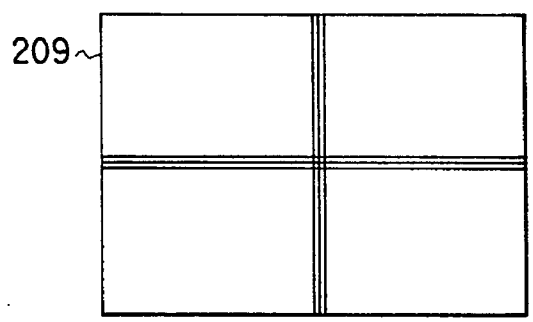
Figure 31D:
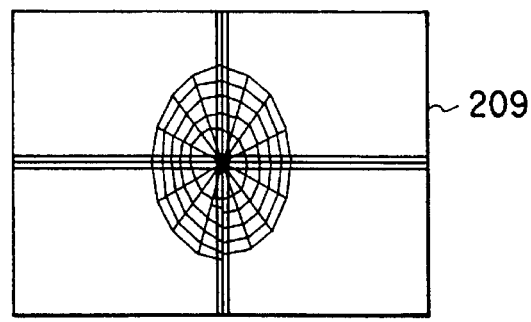
Figure 31E:
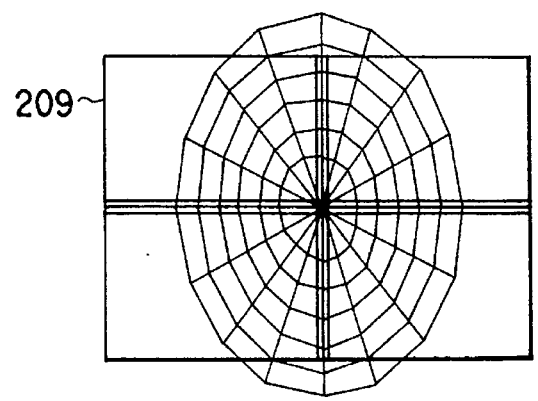

FIGS. 31A and 31B show a state that the objective lens 204 is close to the optical disk 205. At this time, since each of vertical and horizontal radius of the optical beam is changing at a travasal ratio that leading to a focal distance Fo of the objective lens 206, and a focal point distance Fc of the collimating lens 202, a change ratio of the vertical optical beam and a change ratio of the horizontal optical beam differ. FIGS. 31D and 31E show a state that the objective lens 204 is far from the optical disk 205. As mentioned above, though the change ratio of the vertical optical beam and the change ratio of the horizontal optical beam differ, the converging positions of the vertical and horizontal directions are basically the same, and the focal error can be detected by the conventional focal error detection method.

The structure of the holographic element 208 and the photodetector 209 is based on the same principle as specifically described in "Optical Head Device" of Japanese patent application 3-244413. The following will explain a case in which the use of the beam shaping prism is added to the principle.

Figure 32A:
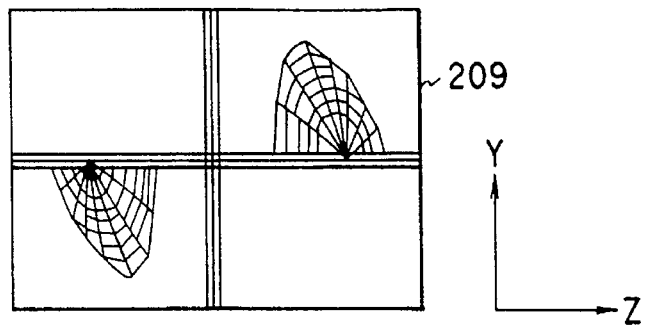
FIGS. 32A to 32G are views showing a change of a spot shape of an incident light beam on the detection surface of the photodetector relating to a focal error of FIG. 29, respectively.
Figure 32B:
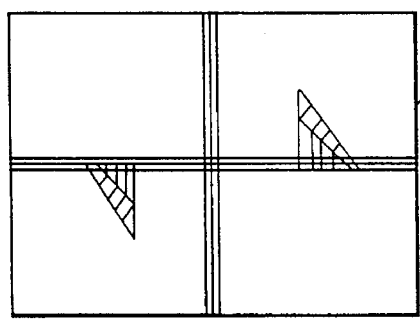
Figure 32E:
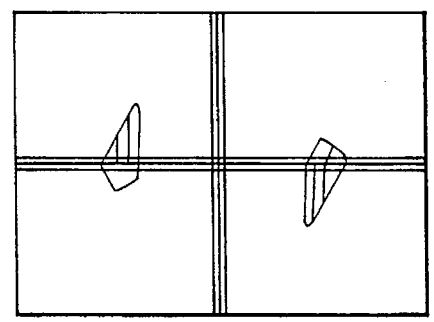
Figure 32C:
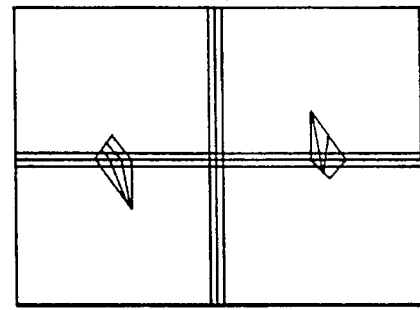
Figure 32F:
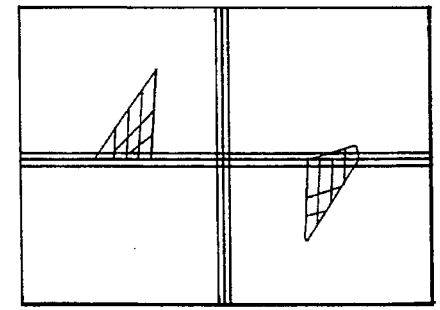
Figure 32D:
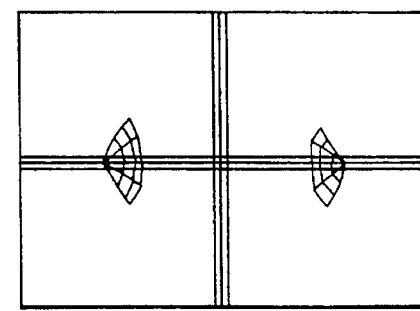
Figure 32G:
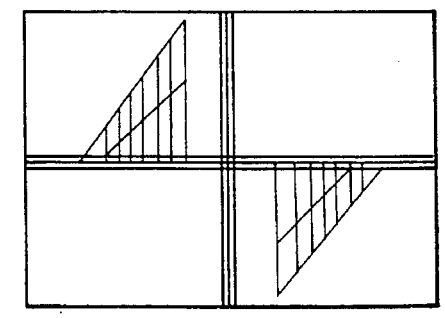

More specifically, the focal error is detected by + primary light of the holographic element 208. Each of FIGS. 32A to 32G shows the change of the light beam on the photodetector 209 in a case where the optical disk 207 is shifted from the focal position of the objective lens 206. FIG. 32D shows a case that the optical disk 207 is placed at the focal position of the objective lens 206. The photodetector 209 is divided into four in order to obtain a focal error signal. The other figures show a case that the position of the optical disk 207 is shifted from the focal position of the objective lens 206. If the beam shaping prism is provided, the change ratio of the vertical optical beam and the change ratio of the horizontal optical beam differ. However, even if the beam shaping prism is provided, the direction of the vertical change of the light beam and that of the horizontal change of the light beam unchange when the focal error is changed. If the focal point is changed on the photodetector 209, unfavorable influence is exerted on the shape of the light beam. However, no influence is exerted on the direction where the light beam is moved even if the focal point is changed. In other words, no influence is exerted on the focal error signal when the direction where the light beam is moved and the focal error are detected by the photodetector 209. Therefore, a focal error signal can be obtained.

Figure 33A:
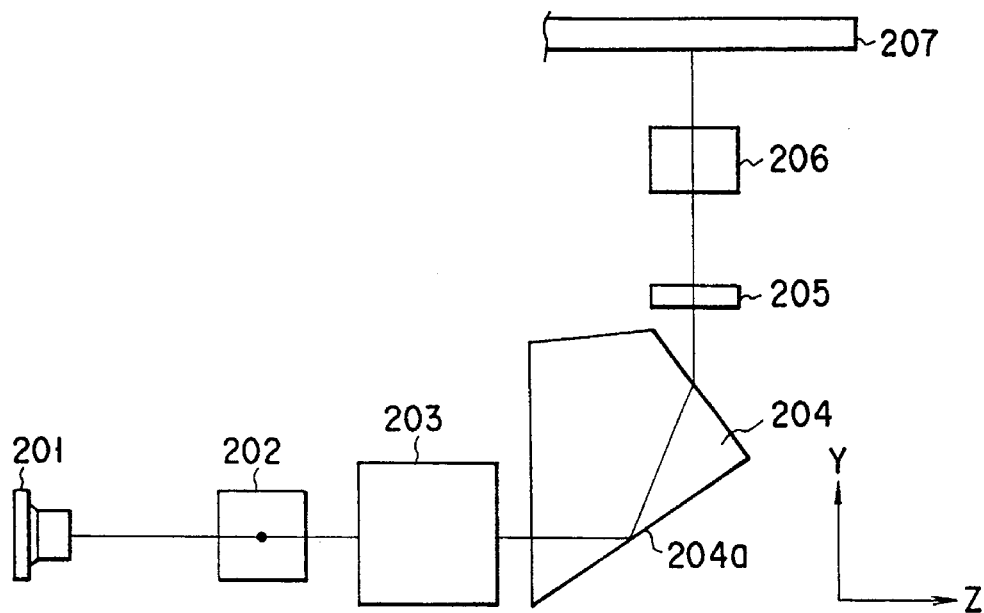
FIGS. 33A and 33B show an example in which focal error sensitivity of the embodiment of FIG. 29B is increased.
Figure 33B:
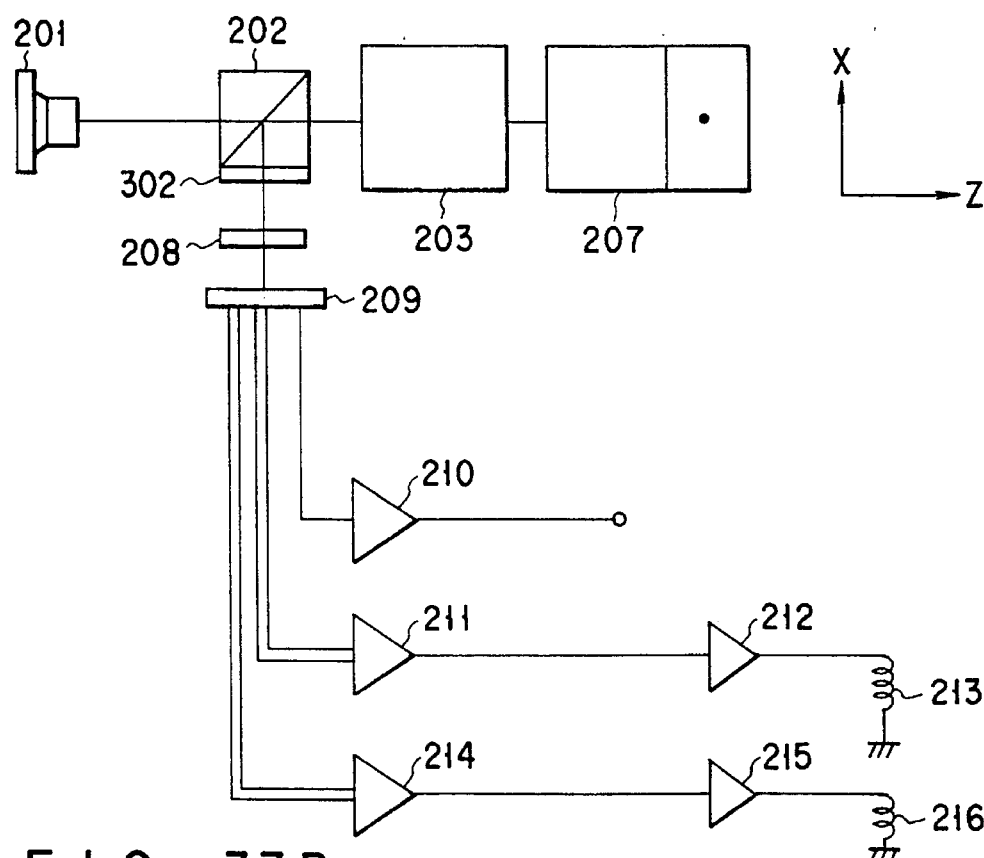

Each of FIGS. 33A and 33B shows an example of the structure for further improving sensitivity of the focal error signal of FIGS. 29A and 29B. In FIGS. 33A and 33B, the polarization beam splitter 202 is provided at the position of the holographic element 208 of FIG. 29A, and the holographic element 208 is provided between the concave lens 302 and the photodetector 209. Then, the reflected light from the optical disk 207 is expanded by the concave lens 302, so that a long focal distance can be equivalently obtained by the concave lens 302 and the collimating lens 203. By use of this structure, the changing rate of the reflected light shape on the photodetector 202, which is caused by an axial-runout of the optical disk 207, can be increased, and sensitivity of the focal error signal can be further improved.

Each of FIGS. 34A and 34B shows an example in which the beam shaping prism 204 with the reflecting surface 204 is realized in a different form. FIG. 34A is a view seen from the side surface, and FIG. 34B is a view seen from the upper surface. In FIG. 34B, the ¼ wavelength plate 205, the objective lens 206, and the optical disk 207 are omitted in order to understand the figure easily. In a beam shaping prism 264 with a reflecting surface 264a of FIGS. 34A and 34B, the beam shaping prism with the reflecting surface of FIGS. 29A and 29B is uprightly provided so that a light emission surface 264b is formed. Thereby, the beam shaping prism with the reflecting surface can be miniaturized in a Z direction as compared with the beam shaping prism with the reflecting surface of FIGS. 29A and 29B. Also, the degree of freedom is increased in the arrangement of the optical elements. Any shape of the beam shaping prism 204 with the reflecting surface 204b may be used if the beam shaping function and the light beam polarizing function are combined therein. Moreover, similar to FIGS. 33A and 33B, the concave lens 302 is provided, and so that a long focal distance may be equivalently obtained by the concave lens 302 and the collimating lens 203.

In FIGS. 35A and 35B, the direction where the beam shaping function works is changed. In other words, in FIGS. 35A and 35B, in place of the beam shaping prism 204 with the reflecting surface 204a of FIGS. 29A and 29B, the beam shaping prism with no reflecting surface 305 is provided between the collimating lens 203 and the ¼ wavelength plate 205.

Moreover, in order to control the height direction of the beam shaping prism 301, the active layer 201a of the semiconductor laser 201 of FIG. 35B is provided to be placed in a vertical direction on paper where the figure is described. Also, the light beam is emitted to the polarizing beam splitter 202 as shown in FIG. 35B. The emission light is reflected by the polarizing beam splitter 202, and the active layer of the semiconductor laser 201 and the vertical direction are reduced through the collimating lens 203 by the beam shaping prism 301.

The light beam is incident onto the objective lens 206 through the ¼ wavelength plate 205 by a mirror 303, which is used to direct the light beam to the direction of the optical disk 207. Then, the optical disk 7 is irradiated with the light beam. The reflected light from the optical disk 207 is reflected onto the ¼ wavelength plate 205 through the objective lens 206 by the mirror 303, and incident onto the collimating lens 203 through the beam shaping prism 301. The light beam transmits the polarizing beam splitter 202 to be converged on the photodetector 209 through the holographic element 208.

FIG. 35A is a view seen from the side surface, and FIG. 35B is a view seen from the upper surface. In FIG. 35B, the objective lens 206 and the optical disk 207 are omitted in order to understand the figure easily.

As shown in FIGS. 35A and 35B, the light source 201, the beam shaping prism 302, and the mirror 303 are provided, so that the optical head can be made thinner.

Figure 36:
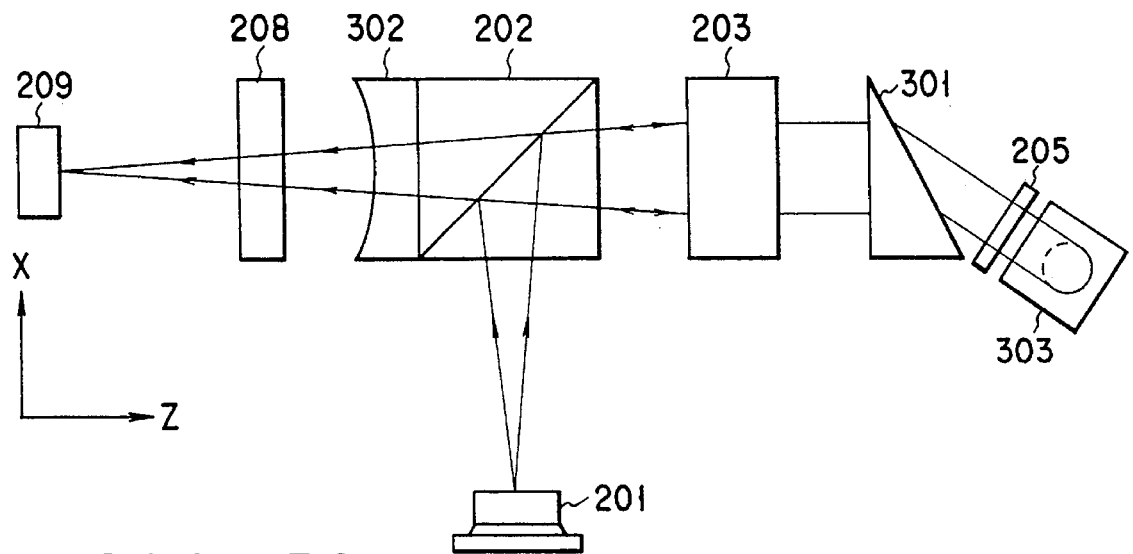
FIG. 36 is a side view showing an example in which focal error sensitivity of the embodiment of FIGS. 35A and 35B is increased.

FIG. 36 is a view showing a state that the concave lens 302 is provided in the detecting system and the long focal distance can be equivalently obtained by the collimating lens 202 and the concave lens 302. Similar to FIGS. 33A and 33B, in FIG. 36, the concave lens 302 is provided at the position of the holographic element 208 of FIG. 25B, and the holographic element 208 is provided between the concave lens 302 and the photodetector 9. FIG. 36 is a view seen from the upper surface, and the objective lens 206 and the optical disk 207 are omitted in order to understand the figure easily.

Figure 37:
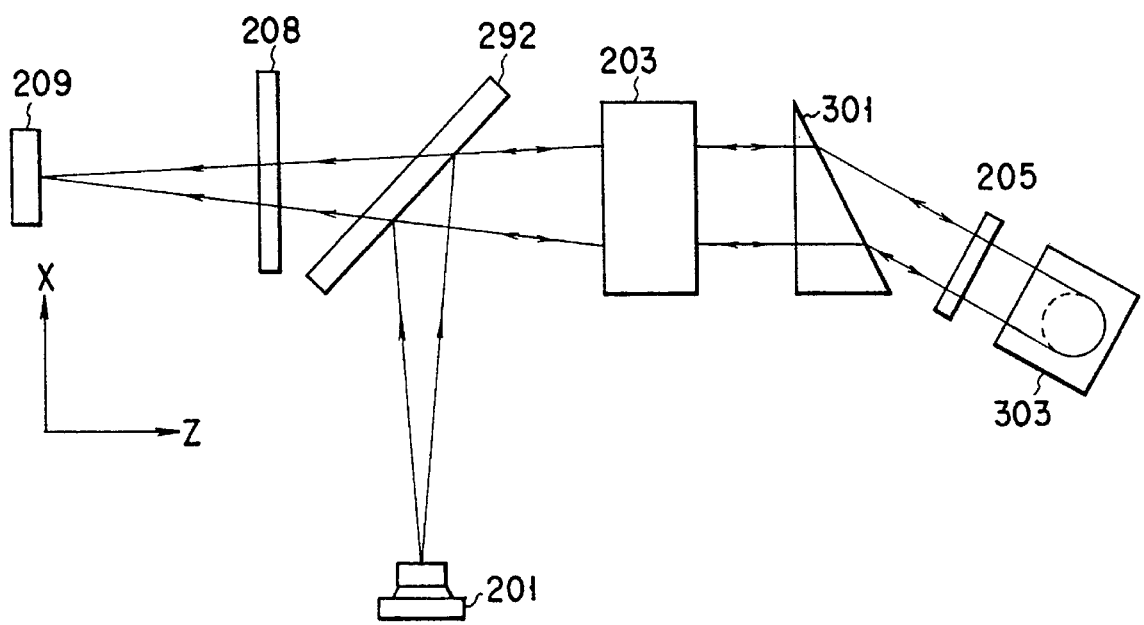
FIG. 37 is a side view schematically showing a main part of the optical head of the other embodiment of the present invention.

FIG. 37 is an example in which the polarizing beam spliter 202 is replaced with a plate type 292. There are merits in that the manufacturing cost can be reduced as compared with the cube type. FIG. 37 is a view seen from the upper surface, and the objective lens 206 and the optical disk 207 are omitted in order to understand the figure easily. Similar to FIGS. 33A, 33B, and 36, the concave lens 302 is provided in the detecting system and the long focal distance may be equivalently obtained by the collimating lens 202 and the concave lens 302.

As explained above, according to the present invention, the feature of the present invention lies in the following point.

More specifically, light reflected on the recording surface of the optical disk passes through the ¼ wavelength plate, and the beam shaping prism surface in the direction, which is opposite to the direction of the forward path, and returns the collimator lens. Thereafter, the returned light is divided into the direction of the light source and the direction of the photodetector by the polarization beam splitter. Also, there is used the structure using the complete separation system between the polarization beam splitter 202 and the ¼ wavelength plate.

As mentioned above, according to the optical head of the present invention, the polarizing beam splitter, the collimating lens, the shaping function element, and the ¼ wavelength plate are provided in the optical path leading to the objective lens from the light source. Then, the light beam reflected on the recording surface of the optical disk passes through the objective lens, the beam shaping function element and the collimating lens in the direction, which is opposite to the direction of the forward path. Thereafter, the optical path is separated in the direction, which is different from the forward path, by the polarizing beam splitter, and the beam light is detected by the photodetector. Then, the control signal for controlling (focus-controlling, tracking controlling) the position of the light spot on the recording surface is generated and the recorded information signal is detected.

According to the optical head device of the present invention, since the collimating lens of the transmitting system is also used as the convex lens of the detecting system, the optical system can be simplified, and the optical head can be small-sized. Also, recording can be performed with a relative high amount of power of the optical source even if the optical disk is rotated at a high speed.

According to the present invention, the present invention relates to the optical head, which at least records information with irradiation of the light beam. Since the optical element of the transmitting system is also used as the optical element of the detecting system, the optical system can be simplified, and the small-sized optical head, which can obtain high light using efficiency.

What is claimed is:

1. An optical head device adapted to be optically coupled to an information record carrier body, said device comprising:

a light source for emitting a light beam having an anisotropic beam shape in a predetermined direction of an optical axis;

a photodetector, provided on a surface perpendicular to said optical axis of said light source to be close to said light source, for detecting a change of a beam diameter in a predetermined direction;

an objective lens, provided close to said information record carrier body, for converging a spot light to said information record carrier body and receiving a reflected light from said information record carrier body;

collimating means, provided among said light source, said photodetector, and the objective lens, having at least a function of converting a light beam having an anisotropic beam shape to substantially a flux of parallel light; and beam shaping means, provided between said collimating means and said objective means, for at least approximating a characteristic of the light beam having an anisotropic beam shape to a characteristic of the light beam having an isotropic beam shape.

2. The device according to claim 1, wherein said beam shaping means has at least a function of shaping the light beam to be isotropic by reducing the smaller direction of the collimating angle of the light beam emitted from said light source.

3. The device according to claim 2, further comprising:

holographic means, provided among said light source, said photodetector, and said collimating means, for deflecting reflected light emitted from said collimating means and entered said holographic means itself in a direction different from a direction where emission light emitted from said light source and entered said holographic means itself.

4. The device according to claim 2, further comprising:

beam spliter means, provided among said light source, said photodetector, and said beam shaping means, for beam-splitting light from said light source into first light directing to said beam shaping means and second light directing to said photodetector; and another photodetector for detecting said second light obtained by said beam spitting means.

5. The device according to claim 4, wherein said beam splitter means is provided among said light source, said photodetector, and said collimating means.

6. The device according to claim 4, wherein said beam splitter means is provided between said collimating means and said beam shaping means.

7. The device according to claim 1, wherein said beam shaping means has at least a function of shaping the light beam to be isotropic by expanding a smaller direction of an collimating angle of the light beam emitted from said light source.

8. The device according to claim 7, further comprising:

holographic means, provided among said light source, said photodetector, and said collimating means, for deflecting reflected light emitted from said collimating means and entered said holographic means itself in a direction different from a direction where emission light emitted from said light source and entered said holographic means itself.

9. The device according to claim 7, wherein said beam shaping means comprises means for expanding the smaller direction of the collimating angle of the light beam emitted from said light source at a magnification of 1.0 or slightly less; and means for detecting the change of the beam diameter of said light beam in a predetermined direction.

10. The device according to claim 7, wherein said beam shaping means comprises means for diverging the smaller direction of the collimating angle of the light beam emitted from said light source at a magnification of 1.0 or slightly less; and means for detecting the change of the beam diameter of said light beam in a direction parallel to an active layer of a semiconductor laser when said light source is the semiconductor laser.

11. The device according to claim 7, wherein said beam shaping means comprises means for diverging the smaller direction of the collimating angle of the light beam emitted from said light source at a magnification of 1.0 or slightly less; means for detecting the change of the beam diameter of said light beam in a direction parallel to an active layer of a semiconductor laser when said light source is the semiconductor laser; and means for detecting the change of said light beam diameter in a direction where a beam shaping is provided by said beam shaping means.

12. The device according to claim 7, wherein said beam shaping means comprises means for expanding the smaller direction of the collimating angle of the light beam emitted from said light source at a magnification of 1.0 or slightly more; and means for detecting the change of the beam diameter of said light beam in the predetermined direction.

13. The device according to claim 7, wherein said beam shaping means comprises means for expanding the smaller direction of the collimating angle of the light beam emitted from said light source at a magnification of 1.0 or slightly more; and means for detecting the change of the beam diameter of said light beam in a direction parallel to an active layer of a semiconductor laser when said light source is the semiconductor laser.

14. The device according to claim 7, wherein said beam shaping means comprises means for expanding the smaller direction of the collimating angle of the light beam emitted from said light source at a magnification of exceeding 1.0 or slightly more; means for detecting the change of the beam diameter of said light beam in a direction parallel to an active layer of a semiconductor laser when said light source is the semiconductor laser; and means for detecting the change of said light beam diameter in a direction where a beam shaping is provided by said beam shaping means.

15. The device according to claim 7, further comprising:
beam spliter means, provided between said beam shaping means and said collimating means, for beam-splitting light directing to said collimating means from said beam shaping means into first light directing to said collimating means and second light directing in a direction different from said first light; and
another photodetector for detecting said second light obtained by said beam spitting means.

16. An optical head device adapted to be optically coupled to an information record carrier body, said device comprising:
a light source for emitting a light beam having an anisotropic beam shape in a predetermined direction of an optical axis;
a photodetector, provided on a surface perpendicular to said optical axis of said light source to be close to said light source, having a plurality of divided photosensitive regions;
an objective lens, provided close to said information record carrier body, for converging a spot light to said information record carrier body and receiving a reflected light from said information record carrier body; and
holographic means, provided among said light source, said photodetector, and said objective lens, having a plurality of divided holograms;
wherein said light source, said photodetector, said objective lens, and said holographic means are formed as one optical unit.

17. The device according to claim 16, wherein said objective lens comprises an optical lens having a specific image-forming magnification equal to ⅙ or less.

18. An optical head device adapted to be optically coupled to an information record carrier body, said device comprising:
a light source for emitting a light beam having an anisotropic beam shape in a predetermined direction of an optical axis;
a photodetector, provided on a surface perpendicular to said optical axis of said light source to be close to said light source, having a plurality of divided photosensitive regions;
an objective lens, provided close to said information record carrier body, for converging a spot light to said information record carrier body and receiving a reflected light from said information record carrier body; and
holographic means, provided among said light source, said photodetector, and said objective lens, having a plurality of divided holograms,
wherein said objective lens comprises an optical lens having a numerical aperture of 0.55 or slightly more.

19. The device according to claim 18, wherein said light source, said photodetector, said objective lens, and said holographic meant are formed as one optical unit.

20. An optical head device adapted to be optically coupled to an information record carrier body, said device comprising:
a light source for emitting a light beam having an anisotropic beam shape in a predetermined direction of an optical axis;
a photodetector, provided on a surface perpendicular to said optical axis of said light source to be close to said light source, having a plurality of divided photosensitive regions;
an objective lens, provided close to said information record carrier body, for converging a spot light to said information record carrier body and receiving a reflected light from said information record carrier body; and
diffraction type optical element means, provided among said light source, said photodetector, and said objective lens, having a predetermined diffraction efficiency such that quantity of light (PL) showing that light emitted from said light source returns to said light source is made smaller than quality of light (PD) entered said photodetector, and a predetermined transmissivity.

21. The device according to claim 20, wherein said light source, said photodetector, said objective lens, and said diffraction type optical element means are formed as one optical unit.

22. The device according to claim 20, wherein said diffraction type optical element means has an aperture for restricting the diameter of the emission light when the emission light from said light source enters said objective lens.

23. An optical head device adapted to be optically coupled to information record carrier bodies, said device comprising:
a first light source for emitting a light beam having an anisotropic beam shape in a predetermined direction of an optical axis;
a first photodetector, provided on a surface perpendicular to said optical axis of said first light source to be close to said first light source, for detecting a change of the beam diameter of the first light source in a predetermined direction;
a second light source, provided at a position different from said first light source, for emitting a light beam having an anisotropic beam shape in a predetermined direction of an optical axis;

a second photodetector, provided on a surface perpendicular to said optical axis of said second light source to be close to said second light source, for detecting a change of the beam diameter of the second light source in a predetermined direction;

an objective lens, provided close to each of said information record carrier bodies, for converging spot light to each information record carrier body and receiving a reflected light from each information record carrier body;

first diffraction type optical element means, provided among said first light source, said first photodetector, and said objective lens, having a predetermined diffraction efficiency and a predetermined transmissivity;

second diffraction type optical element means, provided among said second light source, said second photodetector, and said objective lens, having a predetermined diffraction efficiency and a predetermined transmissivity; and beam splitter means, provided among said first and second diffraction type optical element means and said objective lens, for selectively inputting emission light from said first and second diffraction type optical element means in said objective lens so as to selectively input reflected light of beams outputted from said objective lens to said first and second diffraction type optical element means, respectively.

24. The device according to claim 23, wherein said said first and second light sources, said first and second photodetectors, said objective lens, and said first and second diffraction type optical element means are formed as one optical unit.

25. The device according to claim 23, wherein at least one of said first and second diffraction type optical element means comprises an aperture plate having an aperture for restricting the diameter of the emission light when the emission light from said first and second light sources enter said objective lens.

26. An optical head device adapted to be optically coupled to an information record carrier body, said device comprising:

a light source for emitting a light beam having an anisotropic beam shape in a predetermined direction of an optical axis;

a photodetector, provided on a surface perpendicular to said optical axis of said light source to be close to said light source, having a plurality of divided photosensitive regions;

an objective lens, provided close to said information record carrier body, for converging a spot light to said information record carrier body and receiving a reflected light from said information record carrier body; and holographic means, provided among said light source, said photodetector, and said objective lens, having a plurality of divided holograms, wherein said objective lens comprises an optical lens having a specific image-forming magnification equal to $1/6$ or slightly less.

27. The device according to claim 26, wherein said optical lens has a numerical aperture of 0.55 or slightly more.

* * * * *